(12) United States Patent
Otsuki

(10) Patent No.: US 6,267,467 B1
(45) Date of Patent: Jul. 31, 2001

(54) COLOR PRINTING USING A VERTICAL NOZZLE ARRAY HEAD

(75) Inventor: Koichi Otsuki, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 09/461,396

(22) Filed: Dec. 15, 1999

(30) Foreign Application Priority Data

Dec. 24, 1998 (JP) .................................................. 10-366263

(51) Int. Cl.[7] .............................. B41J 2/21; B41J 2/145; B41J 2/15
(52) U.S. Cl. ................................. 347/43; 347/41
(58) Field of Search .................. 347/43, 41, 15

(56) References Cited

U.S. PATENT DOCUMENTS

| | | | |
|---|---|---|---|
| 4,198,642 | 4/1980 | Gamblin | 347/41 |
| 5,455,610 | * 10/1995 | Harrington | 347/43 |
| 5,512,923 | * 4/1996 | Bauman | 347/15 |
| 5,903,290 | * 5/1999 | Nicoloff, Jr. et al. | 347/43 |
| 5,927,871 | 7/1999 | Nakata | 400/61 |

FOREIGN PATENT DOCUMENTS

| | | |
|---|---|---|
| 53-2040 | 1/1978 | (JP) . |
| 3-207665 | 9/1991 | (JP) . |
| 4-19030 | 3/1992 | (JP) . |
| 5-246048 | 9/1993 | (JP) . |
| 6-135013 | 5/1994 | (JP) . |
| 7-132619 | 5/1995 | (JP) . |

OTHER PUBLICATIONS

U.S. Ser. No. 09/228,969, filed Jan. 12, 1999, pending.
U.S. Ser. No. 09/245,844, filed Feb. 8, 1999, pending.
U.S. Ser. No. 09/366,596, filed Aug. 3, 1999, pending.
U.S. Ser. No. 09/374,845, filed Aug. 16, 1999, pending.
U.S. Ser. No. 09/445,446, filed Dec. 14, 1999, pending.
U.S. Ser. No. 09/461,396, filed Dec. 15, 1999, pending.
U.S. Ser. No. 09/461,620, filed Dec. 15, 1999, pending.
U.S. Ser. No. 09/461,307, filed Dec. 15, 1999, pending.
U.S. Ser. No. 09/461,396, filed Dec. 15, 1999, pending.
U.S. Ser. No. 09/497,177, filed Feb. 3, 2000, pending.
U.S. Ser. No. 09/497,168, filed Feb. 3, 2000, pending.
U.S. Ser. No. 09/461,396, filed Dec. 15, 1999, pending.
U.S. Ser. No. 09/588,712, filed Jun. 7, 2000, pending.
U.S. Ser. No. 09/461,396, filed Dec. 15, 1999, pending.
U.S. Ser. No. 09/642,909, filed Aug. 22, 2000 pending.

* cited by examiner

*Primary Examiner*—Thinh Nguyen
(74) *Attorney, Agent, or Firm*—Oblon, Spivak, McClelland, Maier & Neustadt, P.C.

(57) ABSTRACT

The print head has a first nozzle array and a second nozzle array. The first nozzle array includes a plurality of chromatic color nozzle groups, arranged in the sub-scanning direction, for forming dots of different inks. The second nozzle array includes a plurality of nozzles, arranged parallel to the first nozzle array, for forming black dots, where each of the plurality of chromatic color nozzle groups has an equal number of nozzles. The second nozzle array includes at least a plurality of nozzles disposed at the same sub-scanning positions as the nozzles included in the plurality of chromatic color nozzle groups. In color printing, dots are formed on the print medium using a mutually equal number N (where N is an integer of at least 2) of the nozzles of each chromatic color nozzle group, and of the plurality of nozzles included in the second nozzle array, j sets (where j is an integer of at least 1) of black nozzles, each comprised of N nozzles, are used to form black dots.

15 Claims, 26 Drawing Sheets

Fig. 5 (A) CONCEPT OF SUB-SCAN FEED(s=1)

Fig. 5 (B) PARAMETERS

NOZZLE PITCH k : 3 [dot]
NUMBER OF USED NOZZLES N : 4
NUMBER OF SCAN REPEATS s : 1
NUMBER OF EFFECTIVE NOZZLES Neff : 4

| NUMBER OF SUB-SCAN FEED | 0 | 1 | 2 | 3 |
|---|---|---|---|---|
| FEED AMOUNT L [dot] | 0 | 4 | 4 | 4 |
| ΣL | 0 | 4 | 8 | 12 |
| F=(ΣL)%k | 0 | 1 | 2 | 0 |

Fig. 6 (A) CONCEPT OF SUB-SCAN FEED(s=2)

Fig. 6 (B) PARAMETERS

NOZZLE PITCH k : 3 [dot]
NUMBER OF USED NOZZLES N : 4
NUMBER OF SCAN REPEATS s : 2
NUMBER OF EFFECTIVE NOZZLES Neff : 2

| NUMBER OF SUB-SCAN FEED | 0 | 1 | 2 | 3 | 4 | 5 | 6 |
|---|---|---|---|---|---|---|---|
| FEED AMOUNT L [dot] | 0 | 2 | 2 | 2 | 2 | 2 | 2 |
| ΣL | 0 | 2 | 4 | 6 | 8 | 10 | 12 |
| F=(ΣL)%k | 0 | 2 | 1 | 0 | 2 | 1 | 0 |

Fig. 7

SCAN PARAMETERS IN FIRST EMBODIMENT

Nozzle pitch : $k = 6$ [dots]
Number of scan repeats : $s = 1$
Number of working nozzles : $N = 13$
Number of effective nozzles : $N_{eff} = 13$

| PASS No. | 1 | 2 | 3 | 4 | 5 | 6 | 7 |
|---|---|---|---|---|---|---|---|
| SUB-SCAN No. | 0 | 1 | 2 | 3 | 4 | 5 | 6 |
| FEED L [dots] | 0 | 13 | 13 | 13 | 13 | 13 | 13 |
| $\Sigma L$ | 0 | 13 | 26 | 39 | 52 | 65 | 78 |
| $F=(\Sigma L)\%k$ | 0 | 1 | 2 | 3 | 4 | 5 | 0 |

Fig. 9

FIRST EMBODIMENT

| RASTER LINE No. | PASS No. | | | | | | | | | | | | | | | | | | | |
|---|---|---|---|---|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 | 16 | 17 | 18 | 19 | |
| 1 | C11 | | | | | | M14 | | | | | M1 | | | | | Y4 | | | |
| 2 | | C9 | | | | | | M12 | | | | | | M15 | | | | Y2 | | |
| 3 | | | C7 | | | | | | M10 | | | | Y13 | | | | | | | |
| 4 | | | | C5 | | | | M8 | | | | | Y11 | | | | | | | |
| 5 | | | | C3 | | | | | M6 | | | | | Y9 | | | | | | |
| 6 | | | | | C1 | | | | | M4 | | | | | Y7 | | | | Cmis |
| 7 | C12 | | | | | | M15 | | | | M2 | | | | | Y5 | | | Mmis |
| 8 | | C10 | | | | | | M13 | | | | | × | | | | Y3 | | |
| 9 | | | C8 | | | | | M11 | | | | | | M14 | | | | Y1 | Ymis |
| 10 | | | C6 | | | | | M9 | | | | | Y12 | | | | | | |
| 11 | | | C4 | | | | | M7 | | | | Y10 | | | | | | | |
| 12 | | | C2 | | | | | M5 | | | | | Y8 | | | | | Cmis |
| 13 | C13 | | | | × | | | | M3 | | | | | Y6 | | | | |
| 14 | | C11 | | | | | M14 | | | | M1 | | | | Y4 | | | Mmis |
| 15 | | C9 | | | | | | M12 | | | | | M14 | | | | Y2 | Ymis |
| 16 | | | C7 | | | | | | M10 | | | | Y13 | | | | | | |
| 17 | | | | C5 | | | | M8 | | | | | Y11 | | | | | | |
| 18 | | | | C3 | | | | | M6 | | | | | Y9 | | | | | |
| 19 | C14 | | | | | C1 | | | | M4 | | | | | Y7 | | | | |
| 20 | C12 | | | | | | M15 | | | | M2 | | | | | Y5 | | | |
| 21 | | C10 | | | | | | M13 | | | | | × | | | | Y3 | | |
| 22 | | | C8 | | | | | M11 | | | | | | M14 | | | | Y1 | |
| 23 | | | C6 | | | | | M9 | | | | | Y12 | | | | | | |
| 24 | | | C4 | | | | | M7 | | | | Y10 | | | | | | | |
| 25 | C15 | | | C2 | | | | | M5 | | | | | Y8 | | | | | |
| 26 | | C13 | | | | × | | | | M3 | | | | | Y6 | | | | |
| 27 | | C11 | | | | | M14 | | | | M1 | | | | Y4 | | | | |
| 28 | | C9 | | | | | | M12 | | | | | M14 | | | | Y2 | | |
| 29 | | | C7 | | | | | | M10 | | | | Y13 | | | | | | |
| 30 | | | C5 | | | | | M8 | | | | | Y11 | | | | | | |
| 31 | | | | C3 | | | | | M6 | | | | | Y9 | | | | | |
| 32 | C14 | | | | | C1 | | | | M4 | | | | | Y7 | | | | |
| 33 | | C12 | | | | | M15 | | | | M2 | | | | | Y5 | | | |
| 34 | | | C10 | | | | | M13 | | | | | × | | | | Y3 | | |
| 35 | | | | C8 | | | | M11 | | | | | | M14 | | | | Y1 | |
| 36 | | | | C6 | | | | M9 | | | | | Y12 | | | | | | |
| 37 | | | | C4 | | | | M7 | | | | Y10 | | | | | | | |
| 38 | C14 | | | | | C2 | | | | M5 | | | | | Y8 | | | | |
| 39 | | C13 | | | | | × | | | | M3 | | | | | Y6 | | | |
| 40 | | | C11 | | | | | | M14 | | | | M1 | | | | Y4 | | |

WORKING NOZZLES IN FIRST COMPARATIVE EXAMPLE

Fig. 11

FIRST COMPARATIVE EXAMPLE

| RASTER LINE No. | PASS No. 1 | 2 | 3 | 4 | 5 | 6 | 7 | 8 | 9 | 10 | 11 | 12 | 13 | 14 | 15 | 16 | 17 | 18 | 19 | |
|---|---|---|---|---|---|---|---|---|---|---|---|---|---|---|---|---|---|---|---|---|
| 1 | C11 | | | | | | M11 | | | | | Y11 | | | | | | | | |
| 2 | | C9 | | | | | | M9 | | | | | Y9 | | | | | | | |
| 3 | | | C7 | | | | | M7 | | | | | | Y7 | | | | | | |
| 4 | | | | C5 | | | | | M5 | | | | | | Y5 | | | | | |
| 5 | | | | | C3 | | | | M3 | | | | | | | Y3 | | | | |
| 6 | | | | | | C1 | | | | M1 | | | | | | | Y1 | | | Cmis, Mmis, Ymis |
| 7 | C12 | | | | | | M12 | | | | | Y12 | | | | | | | | |
| 8 | | C10 | | | | | | M10 | | | | | Y10 | | | | | | | |
| 9 | | | C8 | | | | | M8 | | | | | | Y8 | | | | | | |
| 10 | | | | C6 | | | | M6 | | | | | | | Y6 | | | | | |
| 11 | | | | | C4 | | | | M4 | | | | | | | Y4 | | | | |
| 12 | | | | | | C2 | | | | M2 | | | | | | | Y2 | | | Cmis, Mmis, Ymis |
| 13 | C13 | | | | | | M13 | | | | | Y13 | | | | | | | | |
| 14 | | C11 | | | | | | M11 | | | | | Y11 | | | | | | | |
| 15 | | | C9 | | | | | M9 | | | | | | Y9 | | | | | | |
| 16 | | | | C7 | | | | M7 | | | | | | | Y7 | | | | | |
| 17 | | | | | C5 | | | | M5 | | | | | | | Y5 | | | | |
| 18 | | | | | | C3 | | | | M3 | | | | | | | Y3 | | | |
| 19 | | | | | | | C1 | | | | M1 | | | | | | | Y1 | | |
| 20 | C12 | | | | | | M12 | | | | | Y12 | | | | | | | | |
| 21 | | C10 | | | | | | M10 | | | | | Y10 | | | | | | | |
| 22 | | | C8 | | | | | M8 | | | | | | Y8 | | | | | | |
| 23 | | | | C6 | | | | M6 | | | | | | | Y6 | | | | | |
| 24 | | | | | C4 | | | | M4 | | | | | | | Y4 | | | | |
| 25 | | | | | | C2 | | | | M2 | | | | | | | Y2 | | | |
| 26 | C13 | | | | | | M13 | | | | | Y13 | | | | | | | | |
| 27 | | C11 | | | | | | M11 | | | | | Y11 | | | | | | | |
| 28 | | | C9 | | | | | M9 | | | | | | Y9 | | | | | | |
| 29 | | | | C7 | | | | M7 | | | | | | | Y7 | | | | | |
| 30 | | | | | C5 | | | | M5 | | | | | | | Y5 | | | | |
| 31 | | | | | | C3 | | | | M3 | | | | | | | Y3 | | | |
| 32 | | | | | | | C1 | | | | M1 | | | | | | | Y1 | | |
| 33 | C12 | | | | | | M12 | | | | | Y12 | | | | | | | | |
| 34 | | C10 | | | | | | M10 | | | | | Y10 | | | | | | | |
| 35 | | | C8 | | | | | M8 | | | | | | Y8 | | | | | | |
| 36 | | | | C6 | | | | M6 | | | | | | | Y6 | | | | | |
| 37 | | | | | C4 | | | | M4 | | | | | | | Y4 | | | | |
| 38 | | | | | | C2 | | | | M2 | | | | | | | Y2 | | | |
| 39 | C13 | | | | | | M13 | | | | | Y13 | | | | | | | | |
| 40 | | C11 | | | | | | M11 | | | | | Y11 | | | | | | | |

EQUIVALENT NOZZLE POSITIONING

Fig. 14

SCAN PARAMETERS IN SECOND EMBODIMENT

Nozzle pitch : $k = 6$ [dots]
Number of scan repeats : $s = 1$
Number of working nozzles : $N = 15$
Number of effective nozzles : $N_{eff} = 15$

| PASS No. | 1 | 2 | 3 | 4 | 5 | 6 | 7 |
|---|---|---|---|---|---|---|---|
| SUB-SCAN No. | 0 | 1 | 2 | 3 | 4 | 5 | 6 |
| FEED L [dots] | 0 | 14 | 15 | 16 | 16 | 15 | 14 |
| $\Sigma L$ | 0 | 14 | 29 | 45 | 61 | 76 | 90 |
| $F=(\Sigma L)\%k$ | 0 | 2 | 5 | 3 | 1 | 4 | 0 |

Fig. 16

SECOND EMBODIMENT

| RASTER LINE No. | PASS No. 1 | 2 | 3 | 4 | 5 | 6 | 7 | 8 | 9 | 10 | 11 | 12 | 13 | 14 | 15 | 16 | 17 | 18 | 19 | |
|---|---|---|---|---|---|---|---|---|---|---|---|---|---|---|---|---|---|---|---|---|
| 1 | | | C8 | | | | | | M9 | | | | | | Y10 | | | | | |
| 2 | C13 | | | | | M14 | | | | | | Y15 | | | | | | | | Cmis, Mmis, Ymis |
| 3 | | | | C3 | | | | | | M4 | | | | | | Y5 | | | | |
| 4 | C11 | | | | | | M12 | | | | | | Y13 | | | | | | | |
| 5 | | | C6 | | | | | M7 | | | | | | Y8 | | | | | | |
| 6 | | | | | C1 | | | | | M2 | | | | | | Y3 | | | | |
| 7 | | C9 | | | | | M10 | | | | | Y11 | | | | | | | | Ymis |
| 8 | C14 | | | | M15 | | | | | | | × | | | | | Y1 | | | Cmis, Mmis |
| 9 | | | | C4 | | | | M5 | | | | | | | Y6 | | | | | |
| 10 | C12 | | | | | M13 | | | | | | Y14 | | | | | | | | |
| 11 | | | C7 | | | | M8 | | | | | | Y9 | | | | | | | |
| 12 | | | | C2 | | | | M3 | | | | | | Y4 | | | | | | |
| 13 | | C10 | | | | M11 | | | | | Y12 | | | | | | | | | Mmis, Ymis |
| 14 | C15 | | | | | × | | | | M1 | | | | | | Y2 | | | | |
| 15 | | | C5 | | | | M6 | | | | | Y7 | | | | | | | | |
| 16 | C13 | | | | | M14 | | | | | Y15 | | | | | | | | | |
| 17 | | | C8 | | | | M9 | | | | | Y10 | | | | | | | | |
| 18 | | | | C3 | | | | M4 | | | | | Y5 | | | | | | | |
| 19 | C11 | | | | | M12 | | | | | Y13 | | | | | | | | | Cmis, Mmis, Ymis |
| 20 | | | | C1 | | | | M2 | | | | | Y3 | | | | | | | |
| 21 | | | C6 | | | | M7 | | | | | Y8 | | | | | | | | |
| 22 | C14 | | | | | M15 | | | | | × | | | | | Y1 | | | | |
| 23 | | C9 | | | | | M10 | | | | Y11 | | | | | | | | | |
| 24 | | | C4 | | | | M5 | | | | | Y6 | | | | | | | | |
| 25 | C12 | | | | | M13 | | | | | Y14 | | | | | | | | | |
| 26 | | | C2 | | | | M3 | | | | | Y4 | | | | | | | | |
| 27 | | C7 | | | | | M8 | | | | Y9 | | | | | | | | | |
| 28 | C15 | | | | × | | | | M1 | | | | Y2 | | | | | | | |
| 29 | | C10 | | | | M11 | | | | | Y12 | | | | | | | | | |
| 30 | | | C5 | | | | M6 | | | | | Y7 | | | | | | | | |
| 31 | C13 | | | | M14 | | | | | Y15 | | | | | | | | | | |
| 32 | | | C3 | | | | M4 | | | | | Y5 | | | | | | | | |
| 33 | | C8 | | | | M9 | | | | Y10 | | | | | | | | | | |
| 34 | | | C1 | | | | M2 | | | | | Y3 | | | | | | | | |
| 35 | C11 | | | | M12 | | | | | Y13 | | | | | | | | | | |
| 36 | | | C6 | | | M7 | | | | | Y8 | | | | | | | | | |
| 37 | C14 | | | | M15 | | | | × | | | | | Y1 | | | | | | |
| 38 | | | C4 | | | M5 | | | | | Y6 | | | | | | | | | |
| 39 | | C9 | | | | M10 | | | | Y11 | | | | | | | | | | |
| 40 | | | | C2 | | | | M3 | | | | | Y4 | | | | | | | |

WORKING NOZZLES IN SECOND COMPARATIVE EXAMPLE

○ : IN USE
● : NOT IN USE

Fig. 18

SECOND COMPARATIVE EXAMPLE

| RASTER LINE No. | PASS No. 1 | 2 | 3 | 4 | 5 | 6 | 7 | 8 | 9 | 10 | 11 | 12 | 13 | 14 | 15 | 16 | 17 | 18 | 19 |
|---|---|---|---|---|---|---|---|---|---|---|---|---|---|---|---|---|---|---|---|
| 1 |  | C8 |  |  |  |  |  | M8 |  |  |  |  |  | Y8 |  |  |  |  |  |
| 2 | C13 |  |  |  |  | M13 |  |  |  | Y13 |  |  |  |  |  |  | Cmis, Mmis, Ymis |  |  |
| 3 |  |  | C3 |  |  |  |  | M3 |  |  |  |  |  |  | Y3 |  |  |  |  |
| 4 | C11 |  |  |  | M11 |  |  |  |  | Y11 |  |  |  |  |  |  |  |  |  |
| 5 |  |  | C6 |  |  |  | M6 |  |  |  |  |  | Y6 |  |  |  |  |  |  |
| 6 |  |  |  | C1 |  |  |  | M1 |  |  |  |  |  |  |  | Y1 |  |  |  |
| 7 |  | C9 |  |  |  | M9 |  |  |  |  | Y9 |  |  |  |  |  |  |  |  |
| 8 | C14 |  |  |  | M14 |  |  |  |  | Y14 |  |  |  |  |  |  | Cmis, Mmis, Ymis |  |  |
| 9 |  |  | C4 |  |  |  |  | M4 |  |  |  |  |  | Y4 |  |  |  |  |  |
| 10 | C12 |  |  |  | M12 |  |  |  |  | Y12 |  |  |  |  |  |  |  |  |  |
| 11 |  |  | C7 |  |  |  | M7 |  |  |  |  | Y7 |  |  |  |  |  |  |  |
| 12 |  |  | C2 |  |  |  |  | M2 |  |  |  |  |  |  | Y2 |  |  |  |  |
| 13 |  | C10 |  |  |  | M10 |  |  |  |  | Y10 |  |  |  |  |  |  |  |  |
| 14 | C15 |  |  |  | M15 |  |  |  |  | Y15 |  |  |  |  |  |  | Cmis, Mmis, Ymis |  |  |
| 15 |  |  | C5 |  |  |  |  | M5 |  |  |  |  |  | Y5 |  |  |  |  |  |
| 16 | C13 |  |  |  | M13 |  |  |  |  | Y13 |  |  |  |  |  |  |  |  |  |
| 17 |  | C8 |  |  |  |  |  | M8 |  |  |  |  |  | Y8 |  |  |  |  |  |
| 18 |  |  | C3 |  |  |  |  | M3 |  |  |  |  |  | Y3 |  |  |  |  |  |
| 19 |  | C11 |  |  |  | M11 |  |  |  |  | Y11 |  |  |  |  |  |  |  |  |
| 20 |  |  |  | C1 |  |  |  | M1 |  |  |  |  |  |  |  | Y1 |  |  |  |
| 21 |  |  | C6 |  |  |  | M6 |  |  |  |  |  | Y6 |  |  |  |  |  |  |
| 22 | C14 |  |  |  | M14 |  |  |  |  | Y14 |  |  |  |  |  |  |  |  |  |
| 23 |  | C9 |  |  |  | M9 |  |  |  |  | Y9 |  |  |  |  |  |  |  |  |
| 24 |  |  | C4 |  |  |  |  | M4 |  |  |  |  |  | Y4 |  |  |  |  |  |
| 25 | C12 |  |  |  | M12 |  |  |  |  | Y12 |  |  |  |  |  |  |  |  |  |
| 26 |  |  | C2 |  |  |  |  | M2 |  |  |  |  |  |  | Y2 |  |  |  |  |
| 27 |  |  | C7 |  |  |  | M7 |  |  |  |  | Y7 |  |  |  |  |  |  |  |
| 28 | C15 |  |  |  | M15 |  |  |  |  | Y15 |  |  |  |  |  |  |  |  |  |
| 29 |  | C10 |  |  |  | M10 |  |  |  |  | Y10 |  |  |  |  |  |  |  |  |
| 30 |  |  | C5 |  |  |  |  | M5 |  |  |  |  |  | Y5 |  |  |  |  |  |
| 31 | C13 |  |  |  | M13 |  |  |  |  | Y13 |  |  |  |  |  |  |  |  |  |
| 32 |  |  | C3 |  |  |  |  | M3 |  |  |  |  |  | Y3 |  |  |  |  |  |
| 33 |  | C8 |  |  |  |  |  | M8 |  |  |  |  |  | Y8 |  |  |  |  |  |
| 34 |  |  |  | C1 |  |  |  | M1 |  |  |  |  |  |  |  | Y1 |  |  |  |
| 35 |  | C11 |  |  |  | M11 |  |  |  |  | Y11 |  |  |  |  |  |  |  |  |
| 36 |  |  | C6 |  |  |  | M6 |  |  |  |  |  | Y6 |  |  |  |  |  |  |
| 37 | C14 |  |  |  | M14 |  |  |  |  | Y14 |  |  |  |  |  |  |  |  |  |
| 38 |  |  | C4 |  |  |  |  | M4 |  |  |  |  |  | Y4 |  |  |  |  |  |
| 39 |  | C9 |  |  |  | M9 |  |  |  |  | Y9 |  |  |  |  |  |  |  |  |
| 40 |  |  |  | C2 |  |  |  |  | M2 |  |  |  |  |  |  | Y2 |  |  |  |

WORKING NOZZLES IN THIRD EMBODIMENT

WORKING NOZZLES IN FOURTH EMBODIMENT

FIRST ACTUATOR VARIATION

SECOND ACTUATOR VARIATION

THIRD ACTUATOR VARIATION

FOURTH ACTUATOR VARIATION

MAIN SCAN

COLOR PRINTING USING A VERTICAL NOZZLE ARRAY HEAD

BACKGROUND OF THE INVENTION

1. Field of the Invention

This invention relates to a color printing apparatus that uses a print head for forming dots of a plurality of colors.

2. Description of the Related Art

Serial scan-type printers and drum scan-type printers are dot recording devices which record dots with a print head while carrying out scans both in a main scanning direction and a sub-scanning direction. There is a technique called "interlace scheme", which is taught by U.S. Pat. No. 4,198,642 and Japanese Patent Laid-Open Gazette No. 53-2040, for improving the image quality of printers of this type, especially ink jet printers.

FIG. 25 is a diagram for explaining an example of the interlace scheme. In this specification, the following parameters are used to define a printing scheme.

N: Number of nozzles;
k: Nozzle pitch [dots];
s: Number of scan repeats;
D: Nozzle density [nozzles/inch];
L: Sub-scanning amount [dots] or [inch];
w: Dot pitch [inch].

The number of nozzles N is the number of nozzles actually used to form dots. In the example of FIG. 18, N=3. The nozzle pitch k is the interval between the centers of the recording head nozzles expressed in units of the recorded image pitch (dot pitch w). In the example of FIG. 25, k=2. The number of scan repeats is the number of main scans in which all dot positions on a main scanning line are serviced. In the example of FIG. 25, s=1, i.e., all dot positions on a main scanning line are serviced in a single main scan. When s is 2 or greater, the dots are formed intermittently in the main scanning direction. This will be explained in detail later. The nozzle density D (nozzle/inch) is the number of nozzles per inch in the nozzle array of the print head. The sub-scanning amount L (inch) is the distance moved in 1 sub-scan. The dot pitch w (inch) is the pitch of the dots in the recorded image. In general, it holds that $w=1/(D \cdot k)$, $k=1/(D \cdot w)$.

The circles containing two-digit numerals in FIG. 25 indicate dot recording positions. As indicated in the legend, the numeral on the left in each circle indicates the nozzle number and the numeral on the right indicates the recording order (the number of the main scan in which it was recorded).

The interlace scheme shown in FIG. 25 is characterized by the configuration of the nozzle array of the recording head and the sub-scanning method. Specifically, in the interlace scheme, the nozzle pitch k indicating the interval between the centers of adjacent nozzles is defined as an integer at least 2, while the number of nozzles N and the nozzle pitch k are selected as integers which are relatively prime. Two integers are "relatively prime" when they do not have a common divisor other than 1. Further, sub-scanning pitch L is set at a constant value given by $N/(D \cdot k)$.

The interlace scheme makes irregularities in nozzle pitch and ink jetting feature to thin out over the recorded image. Because of this, it improves image quality by mitigating the effect of any irregularity that may be present in the nozzle pitch, the jetting feature and the like.

The "overlap scheme", also known as the "multi-scan scheme", taught for example by Japanese Patent Laid-Open Gazette No. 3-207665 and Japanese Patent Publication Gazette No. 4-19030 is another technique used to improve image quality in color ink jet printers.

FIG. 26 is a diagram for explaining an example of the overlap scheme. In the overlap scheme, 8 nozzles are divided into 2 nozzle sets. The first nozzle set is made up of 4 nozzles having even nozzle numbers (left numeral in each circle) and the second nozzle set is made up of 4 nozzles having odd nozzle numbers. In each main scan, the nozzle sets are each intermittently driven to form dots in the main scanning direction once every (s) dots. Since s=2 in the example of FIG. 26, a dot is formed at every second dot position. The timing of the driving of the nozzle sets is controlled so that the each nozzle set forms dots at different positions from the other in the main scanning direction. In other words, as shown in FIG. 26, the recording positions of the nozzles of the first nozzle set (nozzles number 8, 6, 4, 2) and those of the nozzles of the second nozzle set (nozzles number 7, 5, 3, 1) are offset from each other by 1 dot in the main scanning direction. This kind of scanning is conducted multiple times with the nozzle driving times being offset between the nozzle sets during each main scan to form all dots on the main scanning lines.

In the overlap scheme, the nozzle pick k is set at an integer at least 2, as in the interlace scheme. However, the number of nozzles N and the nozzle pitch k are not relatively prime, but the nozzle pitch k and the value N/s, which is obtained by dividing the number of nozzles N by the number of scan repeats, are set at relatively prime integers instead.

In the overlap scheme, the dots of each main scanning line are not all recorded by the same nozzle but by multiple nozzles. Even when the nozzle characteristics (pitch, jetting feature etc.) are not completely uniform, therefore, enhanced image quality can be obtained because the characteristics of the individual nozzles is prevented from affecting the entire main scanning line.

However, what is the preferred printing scheme in terms of improving the quality of the printed image differs depending on the arrangement of the print head nozzle array. This means that for a specific print head, it can be difficult to set a printing scheme for improving the quality.

SUMMARY OF THE INVENTION

Accordingly, an object of the present invention is to provide a printing technique that makes it possible to obtain high image quality with a specific print head.

The present invention is directed to a printing technique using a printing apparatus having a specific print head. The print head has a first dot formation element array and a second dot formation element array. The first dot formation element array includes a plurality of chromatic color dot formation element groups, arranged in the sub-scanning direction, for forming dots of different inks. The second dot formation element array includes a plurality of dot formation elements, arranged parallel to the first dot formation element array, for forming black dots, where each of the plurality of chromatic color dot formation element groups has an equal number of dot formation elements. The second dot formation element array includes at least a plurality of dot formation elements disposed at the same sub-scanning positions as the dot formation elements included in the plurality of chromatic color dot formation element groups. In color printing, dots are formed on the print medium using a mutually equal number N (where N is an integer of at least 2) of the dot formation elements of each chromatic color dot formation element group, and of the plurality of dot formation elements included in the second dot formation element array, j sets (where j is an integer of at least 1) of black dot formation elements, each comprised of N dot formation elements, are used to form black dots.

It is possible to obtain a desired image quality by setting at a prescribed value the number of sets j of the element groups for forming the black dots used in color printing. That is, with the present invention it is possible to execute printing that enables high image quality to be obtained using the specific print head.

When j is 1, formation of black dots is implemented using only black dot formation elements located at the same sub-scanning positions as chromatic color dot formation elements in use of a specific chromatic color dot formation element group within the first dot formation element array, the specific chromatic color dot formation element group being a group that can print dots before the other chromatic color dot formation element groups.

Thus, at each location on the print medium black dots are formed earlier than dots of the other colors, preventing bleeding of the black dots and making it possible to obtain color images of a high chroma to be obtained.

When j is at least 2, j sets of black dot formation elements are used to print black dots at j different groups of dot positions along main scanning lines, respectively.

Thus, formation of black dots on each scanning line is completed using j dot formation elements. Accordingly, even if the dots formed by the dot formation elements at each dot location deviate in the sub-scanning direction, since the deviations of j dot formation elements are averaged, image quality is improved.

The first and second dot formation arrays are preferably formed within an identical actuator.

Since it is thus possible to position adjacent dot formation elements with good precision, image quality can be improved.

Specific aspects of the invention can be applied to various types of printing apparatus, printing methods and computer program products.

These and other objects, features, aspects, and advantages of the present invention will become more apparent from the following detailed description of the preferred embodiments with the accompanying drawings.

BRIEF DESCRIPTION OF THE DRAWINGS

FIG. 7 shows the scanning parameters of a printing scheme according to a first embodiment of the invention.

FIG. 9 is an explanatory diagram of the nozzles used in the first embodiment to form the raster lines during each pass within the effective printing area.

FIG. 11 is an explanatory diagram of the nozzles used in the first comparative example to form the raster lines during each pass within the effective printing area.

FIG. 14 shows the scanning parameters of a printing scheme according to a second embodiment of the invention.

FIG. 16 is an explanatory diagram of the nozzles used in the second embodiment to form the raster lines during each pass within the effective printing area.

FIG. 18 is an explanatory diagram of the nozzles used in the second comparative example to form the raster lines during each pass within the effective printing area.

DESCRIPTION OF THE PREFERRED EMBODIMENT

Figure 1:
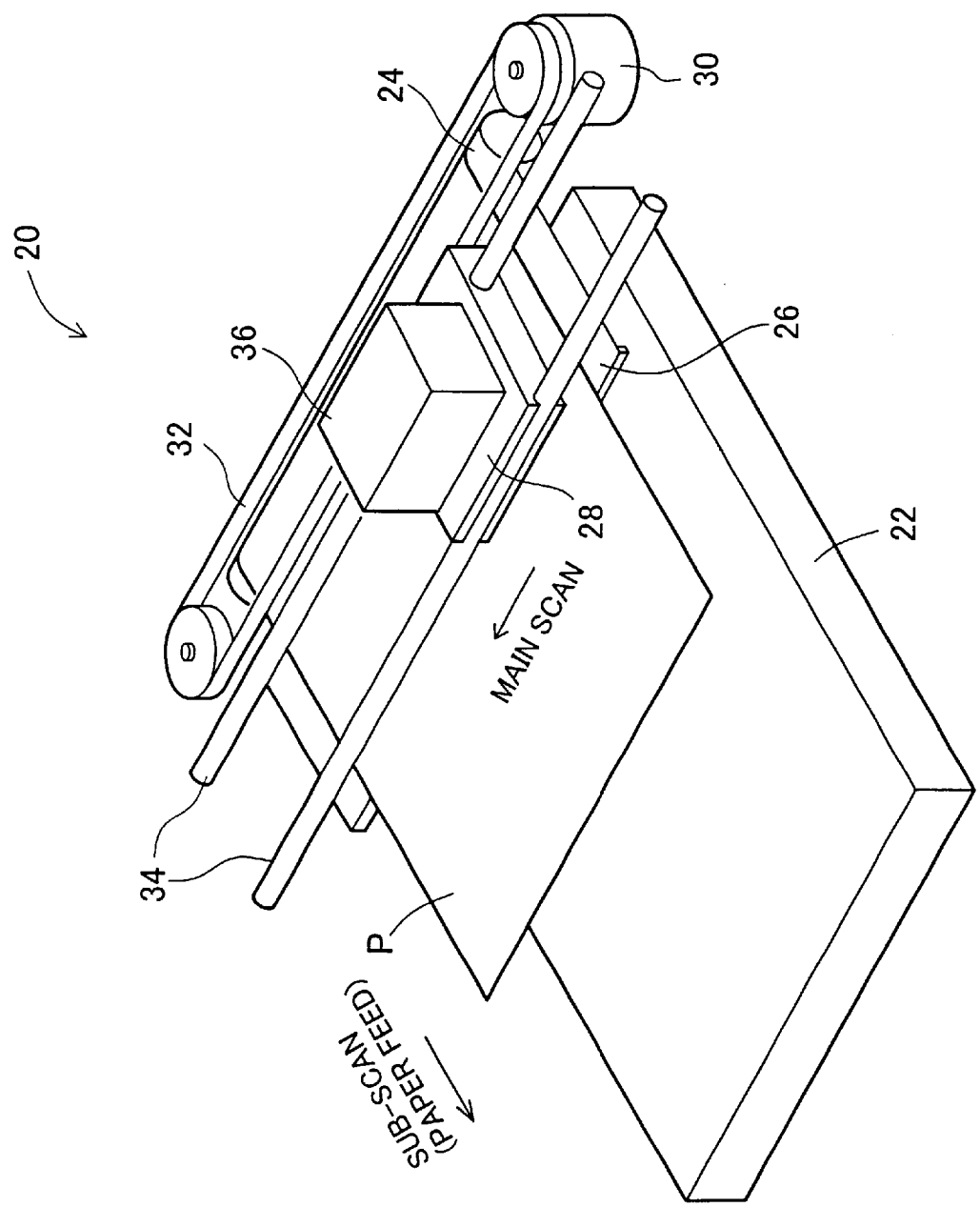
FIG. 1 is a general perspective view of the main structure of a color inkjet printer 20 which is an embodiment of the invention.

A. General Configuration of the Apparatus:

FIG. 1 is a general perspective view of the configuration of a color inkjet printer 20 which is an embodiment of the invention. The printer 20 includes a paper stacker 22, a feed roller 24 driven by a step motor (not shown), a platen 26, a carriage 28, a step motor 30, a drive belt 32 driven by the step motor 30, and guide rails 34 for the carriage 28. Mounted on the carriage 28 is a print head 36 that has a plurality of nozzles.

The feed roller 24 draws paper P from the stacker 22 and feeds the paper in the sub-scanning direction over the face of the platen 26. The carriage 28 is moved along the guide rails 34 by the action of the drive belt 32 driven by the step motor 30. The main scanning direction is perpendicular to the sub-scanning direction.

Figure 2:
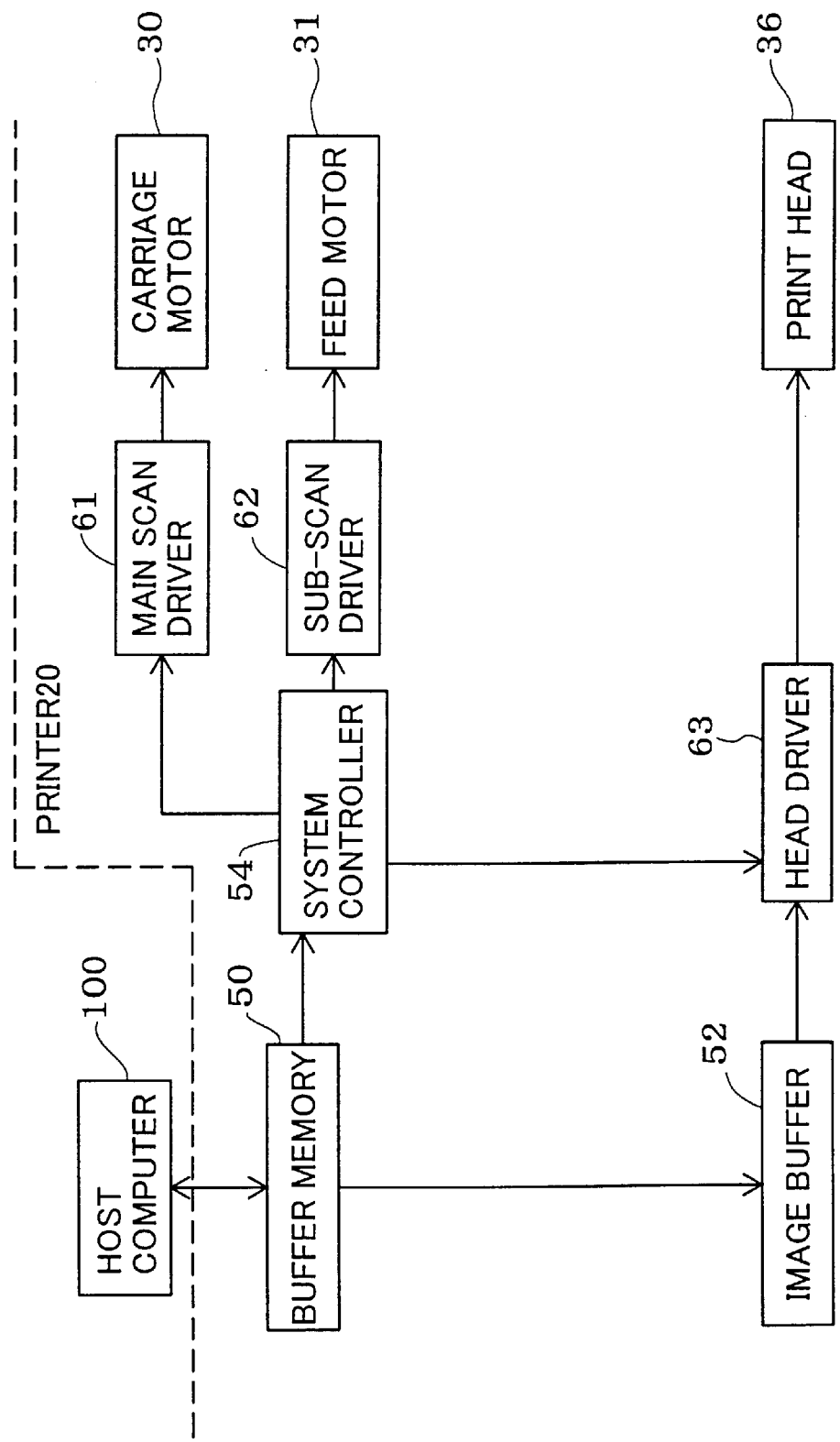
FIG. 2 is a block diagram of the electrical system of the printer 20.

FIG. 2 is a block diagram of the electrical system of the printer 20. The printer 20 includes a receive buffer memory 50 for receiving signals from a host computer 100, an image buffer memory 52 for storing printing data, and a system controller 54 that controls the overall operation of the printer 20. Connected to the system controller 54 are a main scanning driver 61 for the carriage motor 30, a sub-scanning driver 62 for a feed motor 31, and a head driver 63 for the print head 36.

Based on the printing scheme specified by a user, a printer driver (not shown) of the host computer 100 determines the various parameters that define the printing operations. Based on these parameters, the printer driver generates the printing data needed to effect the printing by the printing scheme concerned, and transfers the printing data to the printer 20, where it is placed in the receive buffer memory 50. The system controller 54 reads the required information contained in the printing data and based on that information sends control signals to the drivers 61, 62 and 63.

The printing data is broken down into the individual color components to obtain image data for each color component which is stored in the receive buffer memory 50. In accordance with the control signals from the system controller 54, the head driver 63 reads out the color component image data from the image buffer memory 52 and uses the data to drive the array of nozzles on the print head 36.

Figure 3:
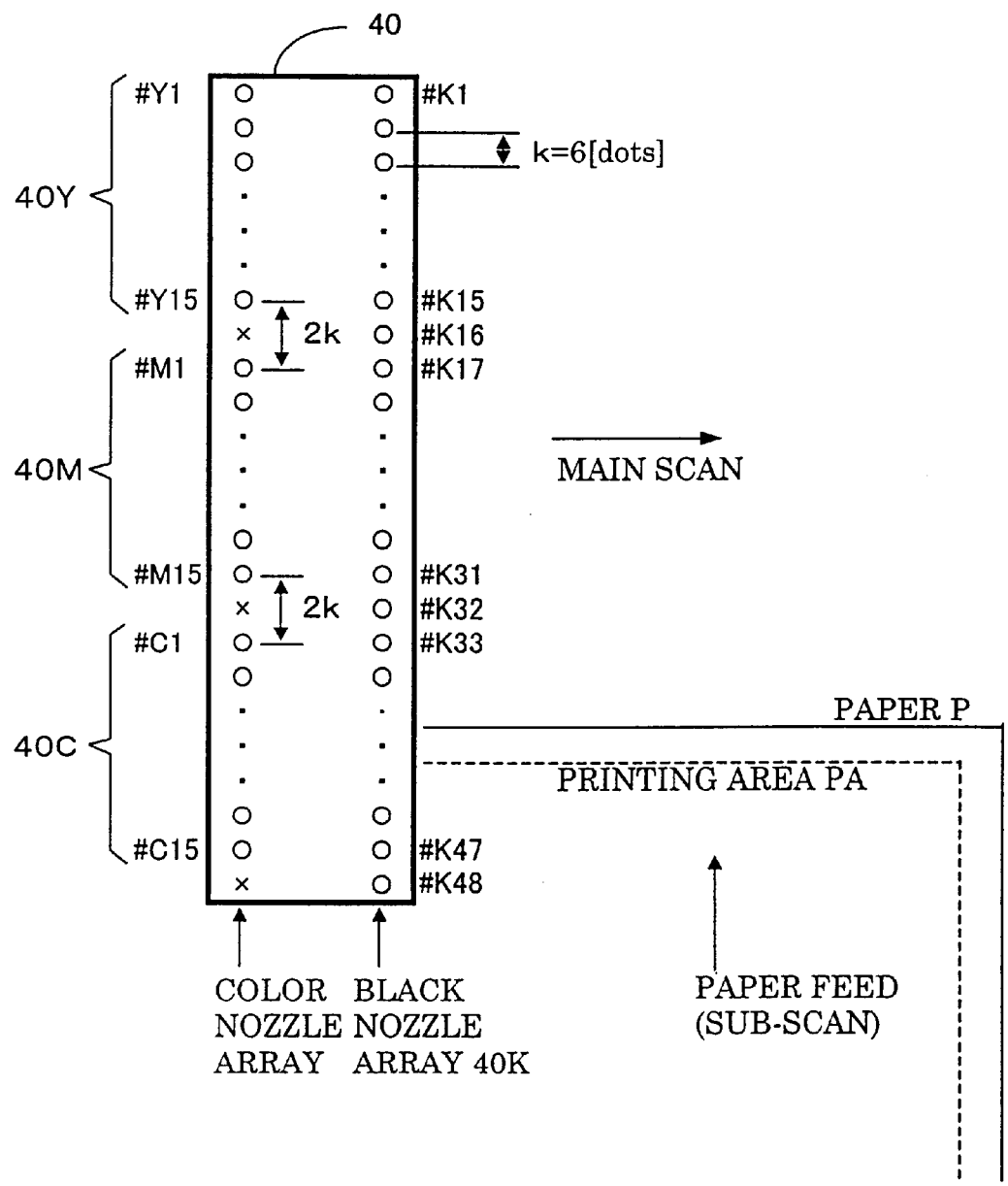
FIG. 3 shows the arrangement of the nozzles formed in the bottom surface of an actuator 40.

B. Print Head Configuration:

FIG. 3 illustrates the arrangement of the nozzles formed in the bottom surface of an actuator 40 provided on the lower part of the print head 36. These nozzles comprise a straight row (array) of color nozzles and a straight row of black nozzles, each arrayed in the sub-scanning direction. Here, "actuator" refers to an ink emission structure that includes nozzles and drive elements for emitting ink such as, for example, piezo-electric elements or heaters. Generally, an actuator nozzle portion is formed in one piece of ceramics. Forming two rows of nozzles in one actuator allows the nozzles to be positioned precisely, resulting in improved image quality.

The array of black nozzles comprises 48 nozzles numbered #K1 to #K48, arrayed in the sub-scanning direction at a constant nozzle pitch k. The nozzle pitch k is six dots. However, for the dot pitch on the paper P, this pitch k may be set at a value that is a multiple of any integer of two or more.

The array of color nozzles includes a group of yellow nozzles 40Y, a group of magenta nozzles 40M and a group of cyan nozzles 40C. Herein, groups of color nozzles are also referred to as groups of chromatic color nozzles. The group of yellow nozzles 40Y has 15 nozzles, numbered #Y1 to #Y15, arrayed at the same pitch k as the black nozzles. The same also applies to the group of magenta nozzles 40M and the group of cyan nozzles 40C. The "x" mark between the lowermost of the yellow nozzles, nozzle #Y15, and the topmost of the magenta nozzles, nozzle #M1, indicates that there is no nozzle formed at that position. Therefore, the space between nozzles #Y15 and #M1 is twice the nozzle pitch k. This also applies to the space between nozzle #M15 and #C1. That is to say, the spacing between the groups of yellow, magenta and cyan nozzles is set at twice the nozzle pitch k.

Like the array of black nozzles 40K, the nozzles of the color nozzle groups 40Y, 40M and 40C are arrayed in the sub-scanning direction. However, in the case of the chromatic color nozzle array, there are no nozzles at the positions corresponding to the 16th, 32nd and 48th black nozzles #K16, #K32 and #K48.

During printing, droplets of ink are expelled from the nozzles as the print head 36 and carriage 28 are moved in the main scanning direction. Depending on the printing scheme, a portion rather than all of the nozzles may be used.

Figure 4:
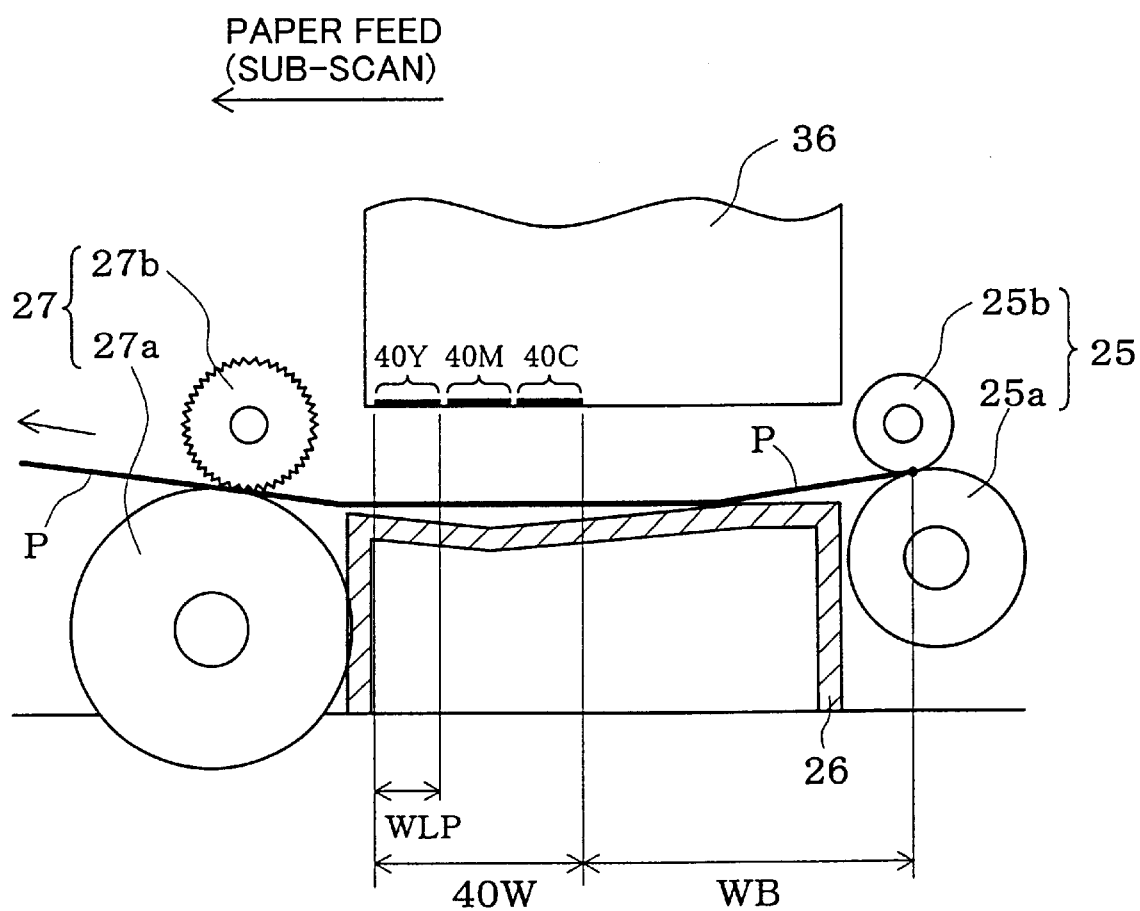
FIG. 4 illustrates the basic arrangement of the sub-scanning drive section used to transport paper P.

C. Configuration of the Sub-scanning Drive Structure:

FIG. 4 illustrates the basic arrangement of the sub-scanning drive section used to transport paper P. This section comprises a first sub-scanning drive mechanism 25 provided at the paper supply end, and a second sub-scanning drive mechanism 27 provided at the paper outlet end. The first sub-scanning drive mechanism 25 is constituted by a feed roller 25a and an idle roller 25b, while the second sub-scanning drive mechanism 27 is constituted by an outlet roller 27a and a serrated roller 27b. The rollers 25a, 25b, 27a and 27b are driven by the rotation of the feed motor 31 transmitted by a gear train (not shown). At the start of printing, the rotation of the rollers 25a and 25b transports paper P from the supply end (on the right in FIG. 4). The leading edge of the paper P is gripped between the rollers 27a and 27b to thereby be transported to the outlet side. After the trailing edge of the paper P has passed beyond the gripping point of the rollers 25a and 25b, it is transported by just the second sub-scanning drive mechanism 27. The print head 36 prints images on the paper P when the paper is over the platen 26.

In this printer, the feed precision of the first sub-scanning drive mechanism 25 is higher than that of the second sub-scanning drive mechanism 27. As such, when the trailing edge of the paper P has passed beyond the gripping point of the rollers of the first sub-scanning drive mechanism 25 and is therefore being transported by just the second sub-scanning drive mechanism 27, the feed precision is lower compared to when the paper is being transported by the first sub-scanning drive mechanism 25.

In FIG. 4, 40W denotes the overall width of the nozzle array in the sub-scanning direction, and WLP denotes the width of the group of yellow nozzles 40Y. This width WLP corresponds to the width of a low precision area, described hereinbelow. WB denotes the distance from the gripping point of the first sub-scanning drive mechanism 25 to the trailing edge of the nozzle arrays. Herein, the leading and trailing edges of the paper and nozzle arrays are defined with respect to the direction in which the paper is fed (the sub-scanning direction). Also, the paper feed direction and sub-scanning direction are defined in terms of the direction in which the paper moves relative to the printer 20 during sub-scanning. Leading edge may also be referred to as upper end or edge, and trailing edge may also be referred to lower end or edge.

D. Basic Conditions of General Recording Scheme

Before describing the dot recording schemes used in the embodiment of the present invention, the following describes basic conditions required for general printing schemes. In this specification, "dot recording scheme" and "printing scheme" have the same meaning.

Figure 5:
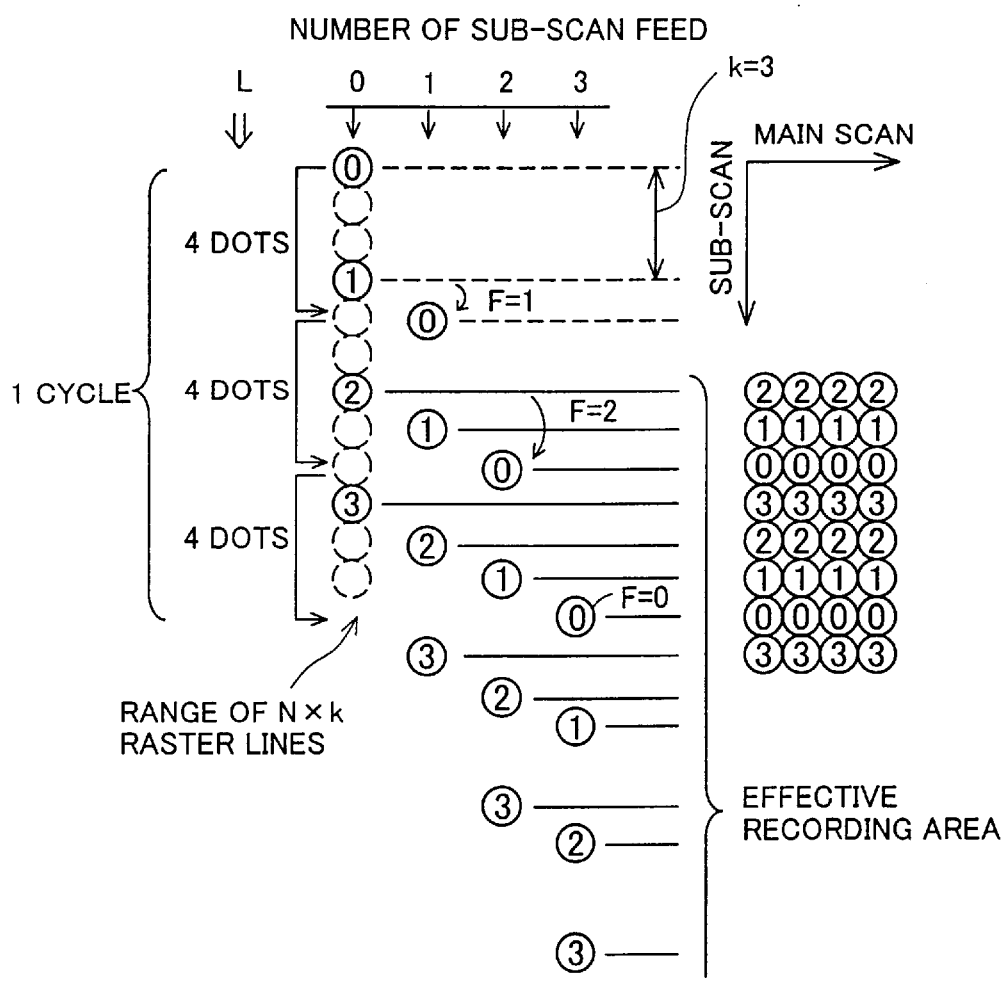
FIGS. 5(A) and 5(B) show the basic conditions of a dot printing scheme in which the number of scan repeats is one.

FIGS. 5(A) and 5(B) show basic conditions of a general dot recording scheme when the number of scan repeats is equal to one. FIG. 5(A) illustrates an example of sub-scan feeds with four nozzles, and FIG. 5(B) shows parameters of the dot recording scheme. In the drawing of FIG. 5(A), solid circles including numerals indicate the positions of the four nozzles in the sub-scanning direction after each sub-scan feed. The encircled numerals 0 through 3 denote the nozzle numbers. The four nozzles are shifted in the sub-scanning direction every time when one main scan is concluded. Actually, however, the sub-scan feed is executed by feeding a printing paper with the sheet feed motor 23 (FIG. 2).

As shown on the left-hand side of FIG. 5(A), the sub-scan feed amount L is fixed to four dots. On every sub-scan feed, the four nozzles are shifted by four dots in the sub-scanning direction. When the number of scan repeats s is equal to one, each nozzle can record all dots (pixels) on the raster line. The right-hand side of FIG. 5(A) shows the nozzle numbers of the nozzles which record dots on the respective raster lines. There are non-serviceable raster lines above or below those raster lines that are drawn by the broken lines, which extend rightward (in the main scanning direction) from a circle representing the position of the nozzle in the sub-scanning direction. Recording of dots is thus prohibited on these raster lines drawn by the broken lines. On the contrary, both the raster lines above and below a raster line that is drawn by the solid line extending in the main scanning direction are recordable with dots. The range in which all dots can be recorded is hereinafter referred to as the "effective record area" (or the "effective print area"). The range in which the nozzles scan but all the dots cannot be recorded are referred to as the "non-effective record area (or the "non-effective print area)". All the area which is scanned with the nozzles (including both the effective record area and the non-effective record area) is referred to as the nozzle scan area.

Various parameters related to the dot recording scheme are shown in FIG. 5(B). The parameters of the dot recording scheme include the nozzle pitch k [dots], the number of used nozzles N, the number of scan repeats s, number of effective nozzles Neff, and the sub-scan feed amount L [dots].

In the example of FIGS. 5(A) and 5(B), the nozzle pitch k is 3 dots, and the number of used nozzles N is 4. The number of used nozzles N denotes the number of nozzles actually used among the plurality of nozzles provided. The number of scan repeats s indicates that dots are formed intermittently once every s dots on a raster line during a single main scan. The number of scan repeats s is accordingly equal to the number of nozzles used to record all dots of each raster line. In the case of FIGS. 5(A) and 5(B), the number of scan repeats s is 1. The number of effective nozzles Neff is obtained by dividing the number of used nozzles N by the number of scan repeats S. The number of effective nozzles Neff may be regarded as the net number of raster lines that can be fully recorded during a single main scan. The meaning of the number of effective nozzles Neff will be further discussed later.

The table of FIG. 5(B) shows the sub-scan feed amount L, its accumulated value ΣL, and a nozzle offset F after each sub-scan feed. The offset F is a value indicating the distance in number of dots between the nozzle positions and reference positions of offset 0. The reference positions are presumed to be those periodic positions which include the initial positions of the nozzles where no sub-scan feed has been conducted (every fourth dot in FIG. 5(A)). For example, as shown in FIG. 5(A), a first sub-scan feed moves the nozzles in the sub-scanning direction by the sub-scan feed amount L (4 dots). The nozzle pitch k is 3 dots as mentioned above. The offset F of the nozzles after the first sub-scan feed is accordingly 1 (see FIG. 5(A)). Similarly, the position of the nozzles after the second sub-scan feed is ΣL(=8) dots away from the initial position so that the offset F is 2. The position of the nozzles after the third sub-scan feed is ΣL(=12) dots away from the initial position so that the offset F is 0. Since the third sub-scan feed brings the nozzle offset F back to zero, all dots of the raster lines within the effective record area can be serviced by repeating the cycle of 3 sub-scans.

As will be understood from the above example, when the nozzle position is apart from the initial position by an integral multiple of the nozzle pitch k, the offset F is zero. The offset F is given by (ΣL)%k, where ΣL is the accumulated value of the sub-scan feed amount L, k is the nozzle pitch, and "%" is an operator indicating that the remainder of the division is taken. Viewing the initial position of the nozzles as being periodic, the offset F can be viewed as an amount of phase shift from the initial position.

When the number of scan repeats s is one, the following conditions are required to avoid skipping or overwriting of raster lines in the effective record area:

Condition c1: The number of sub-scan feeds in one feed cycle is equal to the nozzle pitch k.

Condition c2: The nozzle offsets F after the respective sub-scan feeds in one feed cycle assume different values in the range of 0 to (k−1).

Condition c3: Average sub-scan feed amount (ΣL/k) is equal to the number of used nozzles N. In other words, the accumulated value ΣL of the sub-scan feed amount L for the whole feed cycle is equal to a product (N×k) of the number of used nozzles N and the nozzle pitch k.

The above conditions can be understood as follows. Since (k−1) raster lines are present between adjoining nozzles, the number of sub-scan feeds required in one feed cycle is equal to k so that the (k−1) raster lines are serviced during one feed cycle and that the nozzle position returns to the reference position (the position of the offset F equal to zero) after one feed cycle. If the number of sub-scan feeds in one feed cycle is less than k, some raster lines will be skipped. If the number of sub-scan feeds in one feed cycle is greater than k, on the other hand, some raster lines will be overwritten. The first condition c1 is accordingly required.

If the number of sub-scan feeds in one feed cycle is equal to k, there will be no skipping or overwriting of raster lines to be recorded only when the nozzle offsets F after the respective sub-scan feeds in one feed cycle take different values in the range of 0 to (k−1). The second condition c2 is accordingly required.

When the first and the second conditions c1 and c2 are satisfied, each of the N nozzles records k raster lines in one feed cycle. Namely N×k raster lines can be recorded in one feed cycle. When the third condition c3 is satisfied, the nozzle position after one feed cycle (that is, after the k sub-scan feeds) is away from the initial position by the N×k raster lines as shown in FIG. 5(A). Satisfying the above first through the third conditions c1 to c3 thus prevents skipping or overwriting of raster lines to be recorded in the range of N×k raster lines.

Figure 6:
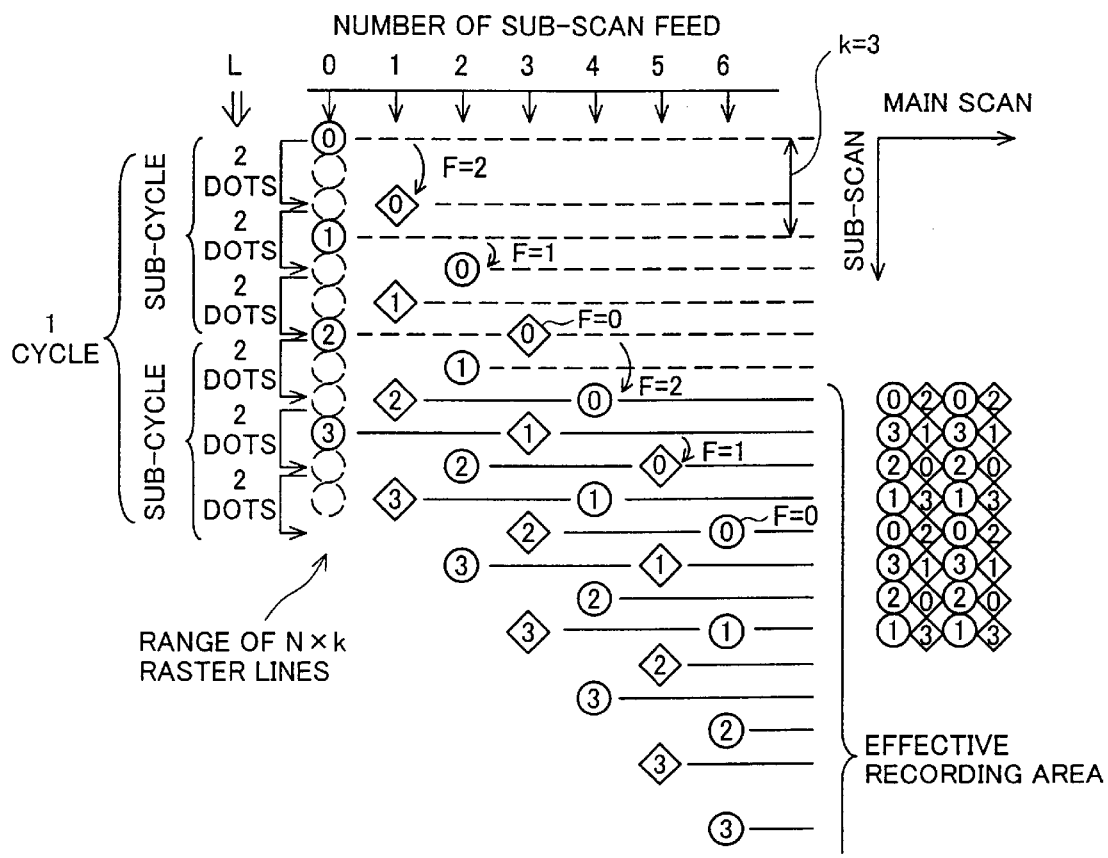
FIGS. 6(A) and 6(B) show the basic conditions of a dot printing scheme in which the number of scan repeats is two or more.

FIGS. 6(A) and 6(B) show the basic conditions of a general dot recording scheme when the number of scan repeats s is at least 2. When the number of scan repeats s is 2 or greater, each raster line is recorded with s different nozzles. In the description hereinafter, the dot recording scheme adopted when the number of scan repeats s is at least 2 is referred to as the "overlap scheme".

The dot recording scheme shown in FIGS. 6(A) and 6(B) amounts to that obtained by changing the number of scan repeats s and the sub-scan feed amount L among the dot recording scheme parameters shown in FIG. 5(B). As will be understood from FIG. 6(A), the sub-scan feed amount L in the dot recording scheme of FIGS. 6(A) and 6(B) is a constant value of two dots. In FIG. 6(A), the nozzle positions after the odd-numbered sub-scan feeds are indicated by the diamonds. As shown on the right-hand side of FIG. 6(A), the dot positions recorded after the odd-numbered sub-scan feed are shifted by one dot in the main scanning direction from the dot positions recorded after the even-numbered sub-scan feed. This means that the plurality of dots on each raster line are recorded intermittently by each of two different nozzles. For example, the upper-most raster in the effective record area is intermittently recorded on every other dot by the No. 2 nozzle after the first sub-scan feed and then intermittently recorded on every other dot by the No. 0 nozzle after the fourth sub-scan feed. In the overlap scheme, each nozzle is generally driven at an intermittent timing so that recording is prohibited for (s−1) dots after recording of one dot during a single main scan.

In the overlap scheme, the multiple nozzles used for recording the same raster line are required to record different positions shifted from one another in the main scanning direction. The actual shift of recording positions in the main scanning direction is thus not restricted to the example shown in FIG. 6(A). In one possible scheme, dot recording is executed at the positions indicated by the circles shown in the right-hand side of FIG. 6(A) after the first sub-scan feed, and is executed at the shifted positions indicated by the diamonds after the fourth sub-scan feed.

The lower-most row of the table of FIG. 6(B) shows the values of the offset F after each sub-scan feed in one feed cycle. One feed cycle includes six sub-scan feeds. The offsets F after each of the six sub-scan feeds assume every value between 0 and 2, twice. The shift in the offset F after the first through the third sub-scan feeds is identical with that after the fourth through the sixth sub-scan feeds. As shown on the left-hand side of FIG. 6(A), the six sub-scan feeds included in one feed cycle can be divided into two sets of sub-cycles, each including three sub-scan feeds. One feed cycle of the sub-scan feeds is completed by repeating the sub-cycles s times.

When the number of scan repeats s is an integer of at least 2, the first through the third conditions c1 to c3 discussed above are rewritten into the following conditions c1' through c3':

Condition c1': The number of sub-scan feeds in one feed cycle is equal to a product (k×s) of the nozzle pitch k and the number of scan repeats s.

Condition c2': The nozzle offsets F after the respective sub-scan feeds in one feed cycle assume every value between 0 to (k−1), s times.

Condition c3': Average sub-scan feed amount $\{\Sigma L/(k \times s)\}$ is equal to the number of effective nozzles Neff (=N/s). In other words, the accumulated value $\Sigma L$ of the sub-scan feed amount L for the whole feed cycle is equal to a product $\{Neff \times (k \times s)\}$ of the number of effective nozzles Neff and the number of sub-scan feeds (k×s).

The above conditions c1' through c3' hold even when the number of scan repeats s is one. This means that the conditions c1' through c3' generally hold for the dot recording scheme irrespective of the number of scan repeats s. When these three conditions c1' through c3' are satisfied, there is no skipping or overwriting of dots recorded in the effective record area. If the overlap scheme is applied (if the number of scan repeats s is at least 2), the recording positions on the same raster should be shifted from each other in the main scanning direction.

Partial overlapping may be applied for some recording schemes. In the "partial overlap" scheme, some raster lines are recorded by one nozzle and other raster lines are recorded by multiple nozzles. The number of effective nozzles Neff can be also defined in the partial overlap scheme. By way of example, if two nozzles among four used nozzles cooperatively record one identical raster line and each of the other two nozzles records one raster line, the number of effective nozzles Neff is 3. The three conditions c1' through c3' discussed above also hold for the partial overlap scheme.

It may be considered that the number of effective nozzles Neff indicates the net number of raster lines recordable in a single main scan. For example, when the number of scan repeats s is 2, N raster lines can be recorded by two main scans where N is the number of actually-used nozzles. The net number of raster lines recordable in a single main scan is accordingly equal to N/S (that is, Neff). The number of effective nozzles Neff in this embodiment corresponds to the number of effective dot forming elements in the present invention.

E. First Embodiment of the Printing Scheme:

FIG. 7 shows the scanning parameters used in a first embodiment of the printing scheme of the invention. In this first embodiment, the nozzle pitch k is six dots, the number of scan repeats is one, the number of working nozzles N is 13 and the number of effective nozzles Neff is 13.

The table in FIG. 7 lists the parameters for each of the first through seventh passes. Herein, a main scan is also referred to as a pass. For each pass, the table shows the sub-scan feed amount L just prior to the pass, the cumulative feed value $\Sigma L$ and the offset F. The sub-scan feed amount L is a fixed value of 13 dots. This printing scheme (scanning scheme) in which L is a fixed value is referred to as a set feed scheme. The scanning parameters of the first embodiment satisfy the aforementioned conditions c1' to c3'.

Figure 8:
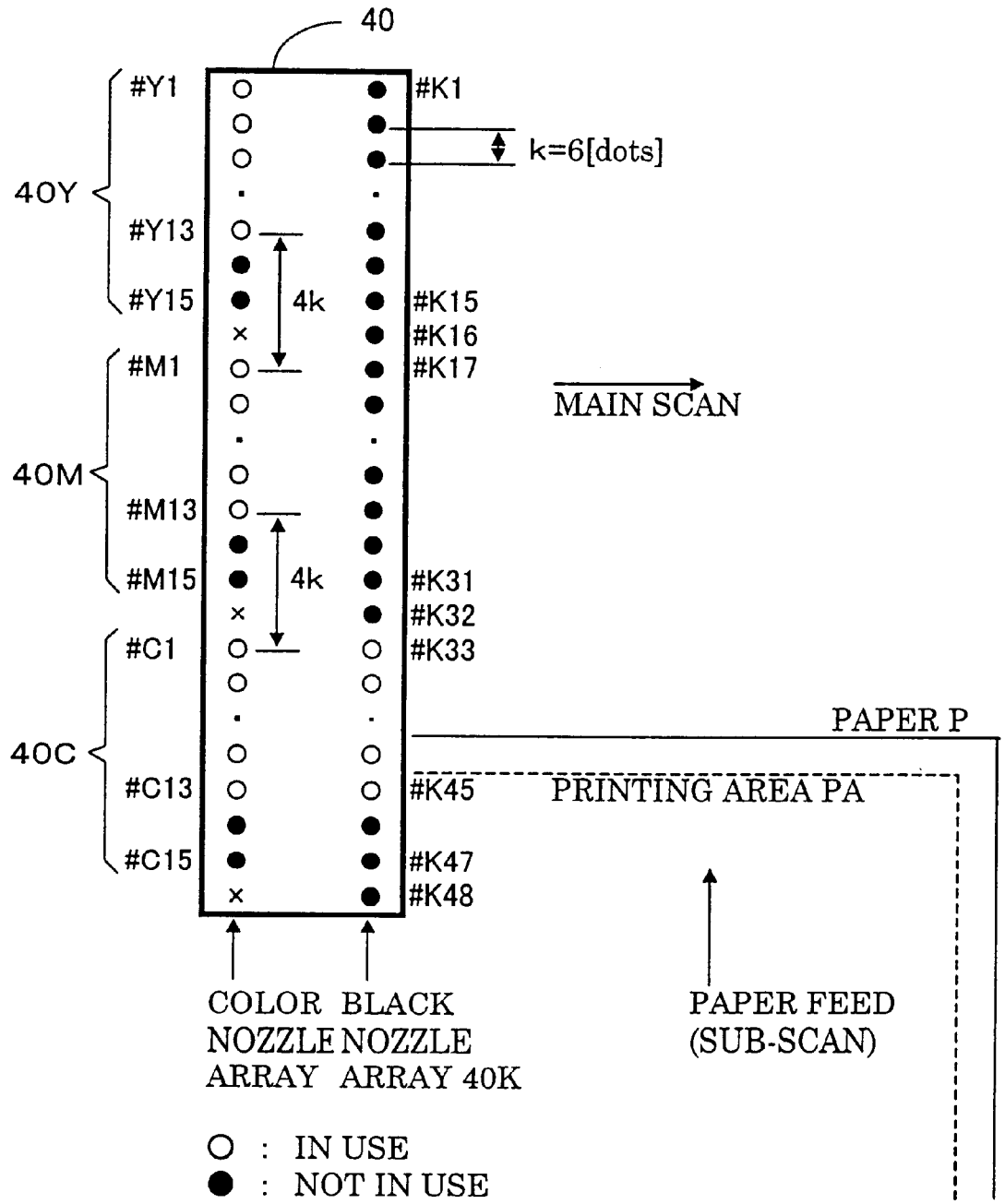
FIG. 8 shows the nozzles used in the first embodiment.

FIG. 8 is a diagram illustrating the nozzles used in the first embodiment. The actuator 40 shown in FIG. 8 is the same as the one shown in FIG. 3, but in the first embodiment only some of the nozzles are used. The open circles indicate the nozzles that are used, and the solid circles indicate the nozzles that are not used. Thus, of the 15 nozzles for each chromatic color ink, just the first 13 are used. With respect to black ink, just the 13 nozzles in the sub-scanning locations corresponding to the cyan nozzles #C1 to #C13 are used. With the same number of nozzles being used for each of the four inks, by scanning using the same parameters for all nozzles, dots of each color can be formed without voids or undesired overlaps.

Herein, the groups of nozzles used for each ink are also referred to as working nozzle groups. Also, the groups of nozzles provided on the actuator 40 for each ink are also referred to as implemented nozzle groups.

Nozzles arrayed at nozzle pitch k are selected to serve as the working nozzles. The nozzle #Y13 at the lower end of the group of yellow nozzles and the nozzle #M1 at the upper end of the group of magenta nozzles are separated by a space that is four times the nozzle pitch k (4k), meaning 24 dots. The nozzle #M13 at the lower end of the group of magenta nozzles and the nozzle #C1 at the upper end of the group of cyan nozzles are also separated by 4k.

With respect to the first embodiment, FIG. 9 is an explanatory diagram of the nozzles used to form the raster lines during each pass, within the effective printing area. In pass 1, nozzles #C11, #C12 and #C13 form dots on the effective raster lines 1, 7 and 13, respectively. An effective raster line is a raster line within the effective printing area. In FIG. 9, the symbol "#" that precedes nozzle numbers is omitted. Hatching indicates nozzles that are not being used. The symbol "x" indicates a location between adjacent groups of working nozzles where there is no nozzle.

For pass 2, the target printing position of the actuator 40 is moved the equivalent of 13 dots away from pass 1 in the sub-scanning direction. In this embodiment the nozzle pitch k is 6, so after the sub-scanning feed, the nozzle position offset F (what remains after the cumulative feed $\Sigma L$ is divided by k) is one dot. In the case of pass 2, therefore, the target raster line appear to be one line below the target raster line of pass 1. In fact, of course, the target raster line for the same nozzle is 13 lines below. In this first embodiment the sub-scanning feed amount L is fixed at 13 dots, so that each time a sub-scanning feed is effected, the position of the target raster line appears to move down one line.

As explained below, with respect to cyan, the cumulative feed error in the sub-scanning direction reaches a maximum at Cmis between raster lines 6 and 7. Raster line 6 is printed on pass 6, while raster line 7 is printed during pass 1. This means that there are five sub-scanning feeds between the printing of raster line 7 during pass 1 and the printing of raster line 6 on pass 6, resulting in the accumulation of the errors of the five feeds. This accumulation of the errors of five feeds also happens between cyan raster lines 12 and 13.

The same type of observation reveals that in the case of magenta, too, the cumulative feed error becomes relatively large at Mmis between raster lines 7 and 8. Similarly, in the case of yellow the cumulative feed error becomes relatively large at Ymis between raster lines 7 and 8. Hereinbelow the position at which the cumulative value of the sub-scanning feed error becomes relatively large is referred to as the accumulated error position.

As can be understood from the above explanation, in the case of the first embodiment the accumulated error position is different for each chromatic color ink. Accumulated error positions are more prone to the formation of banding, which are lines that extend in the main scanning direction, degrading the image quality. However, since in accordance with this first embodiment the accumulated error position is different for each ink color, banding at these positions is less noticeable.

Figure 10:
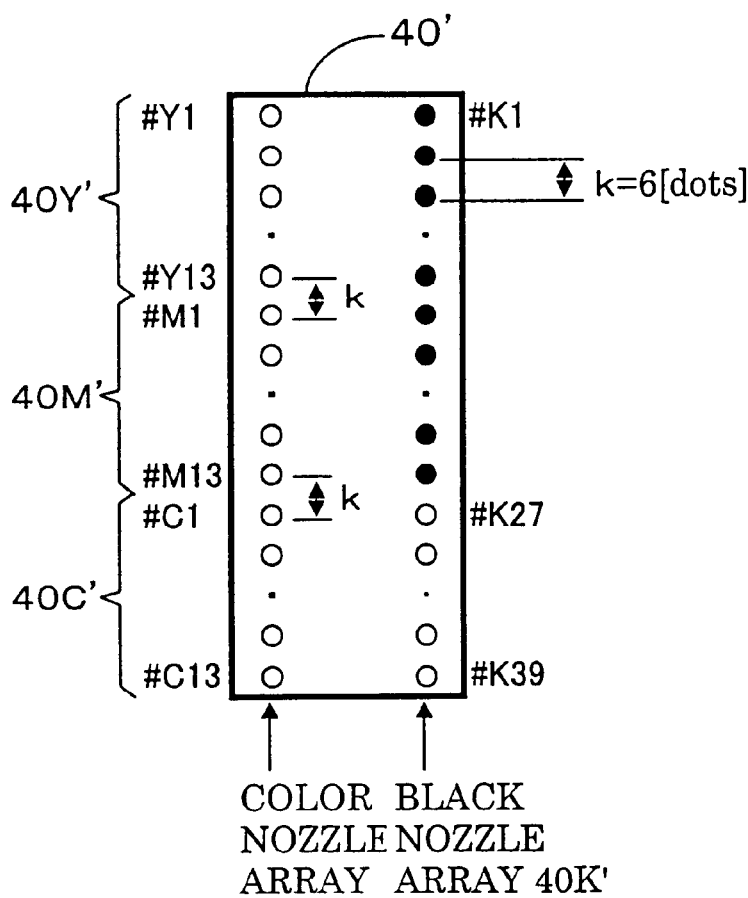
FIG. 10 shows the nozzles used in a first comparative example.

FIG. 10 shows the actuator used in a first comparative example. The actuator 40' is comprised of a group of 13 yellow nozzles 40Y', a group of 13 magenta nozzles 40M' and a group of 13 cyan nozzles 40C'. The spacing between the adjacent end nozzles of the groups is the same as the nozzle pitch k. That is, on the actuator 40' of FIG. 10 the 13 nozzles of each chromatic color used in the arrangement of the first embodiment are arrayed at a nozzle pitch k. The group of black ink nozzles 40K' comprises 39 nozzles, also arrayed at pitch k. The arrangement of this first comparative example uses this actuator 40' to effect printing in accordance with the same scanning parameters as those of the first embodiment shown in FIG. 7.

FIG. 11 is an explanatory diagram showing the nozzles used to form the raster lines during each pass, within the effective printing area, in the case of the first comparative example. The accumulated error positions Cmis, Mmis, Ymis of the three chromatic color inks all fall between raster lines 6 and 7 and between raster lines 12 and 13. In this case banding tends to be more noticeable, and is therefore highly likely to degrade the image quality.

As can be seen from a comparison between the working nozzles of FIG. 8 and 10, the only difference between the first embodiment and the first comparative example is the spacing between the groups of working nozzles. Specifically, in the case of the first embodiment the spacing between the groups is set at 4k (four times the nozzle pitch k) while in the case of the first comparative example the spacing is the same as the nozzle pitch k. This difference in the spacing between the groups of working nozzles is manifested in the differences between the accumulated error positions Cmis, Mmis and Ymis seen in FIG. 9 and 11.

To avoid as far as possible the accumulated error positions of adjacent nozzle groups coinciding in the sub-scanning direction, it is desirable to use a selection of working nozzles that results in the spacing between adjacent groups of working nozzles being M times the nozzle pitch k, where M is an integer of 2 or more.

Figure 12:
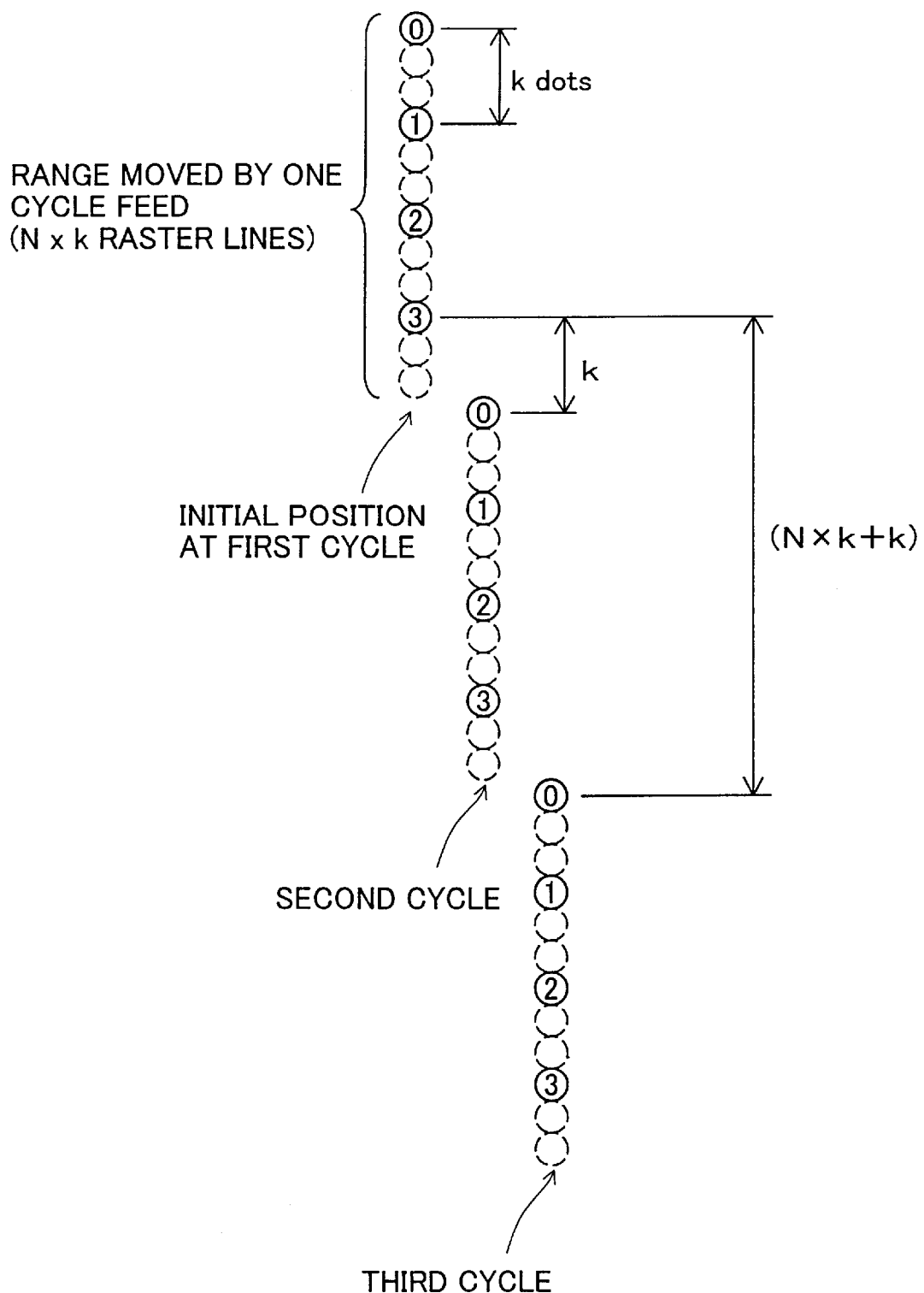
FIG. 12 shows an equivalent nozzle positioning arrangement.

However, it is also desirable for the spacing between adjacent groups of working nozzles to be set as follows. FIG. 12 illustrates an equivalent nozzle positioning arrangement used in the printing scheme of FIG. 5(A). As also explained with reference to FIG. 5(A), when the number of scan repeats is one, one scanning cycle includes k sub-scanning feeds. Therefore, the amount by which the nozzle group is moved by the sub-scanning feed of one cycle is N×k raster lines. FIG. 12 shows the initial position of the nozzle group in each of the first through third cycles. Since the same printing operation is implemented from these three nozzle group positions, the positions are mutually equivalent. The spacing between the nozzle at the lower end at the initial position in the first cycle and the nozzle at the upper end at the initial position in the second cycle is k dots. Also, the spacing between the nozzle at the lower end at the initial position in the first cycle and the nozzle at the upper end at the initial position in the third cycle is (N×k+k) dots. While not illustrated, it can be understood that the spacing between the nozzle at the lower end at the initial position in the first cycle and the nozzle at the upper end at the initial position in the fourth cycle will be (2×N×k+k) dots. Normally the spacing between the nozzle at the lower end at the initial position in the first cycle and the nozzle at the upper end of another equivalent nozzle group is expressed as (N×n+1)k dots. Here, n is an arbitrary integer of zero or more.

When working nozzle groups used for different inks are disposed in the type of equivalent positional arrangement shown in FIG. 12, the result is a mutual coincidence of the accumulated error positions in respect of those inks. To prevent this happening, it is desirable to set the spacing between adjacent groups of working nozzles to a value other than (N×n+1)k dots (N being the number of working nozzles and n an arbitrary integer of one or more). Here, n is specified as being one or more rather than zero or more because if, as described above, the spacing between adjacent groups of working nozzles is M times the nozzle pitch k, where M is an integer of 2 or more, n=0 would be excluded.

The first embodiment also has the following features. As seen from the above-described FIG. 8, during main scanning the array of black nozzles 40K precedes the arrays of color nozzles, so during color printing black dots are printed before dots of other colors. Also, in the sub-scanning direction the color nozzles are arrayed in the order cyan nozzles 40C, then magenta nozzles 40M, then yellow nozzles 40Y, meaning that chromatic color dots are formed in that order. Moreover, with respect to the group of working nozzles used for black, the only nozzles used are those provided in the same sub-scanning locations as the group of cyan working nozzles disposed on the trailing edge in the sub-scanning direction.

In effecting color printing in accordance with the first embodiment, this feature of the actuator 40 gives rise to the following various advantages or benefits. The first advantage is that black dots are formed before the dots of the other inks. When black dots are formed after instead of before dots of other colors, the black ink tends to bleed, lowering the chroma of the color image. Chroma degradation is particularly conspicuous when there is bleeding between black and yellow inks. By selecting the working nozzle group arrangement shown in FIG. 8, at any arbitrary position within the printing area black dots are formed before the dots of the other colors, making it possible to improve the chroma of the color images.

A second advantage is that, at any arbitrary position within the printing area, yellow dots are formed after the dots of other colors. As can be seen from FIG. 8, when the paper P is being transported in the sub-scanning direction, at any arbitrary point within the printing area PA, black dots will first be formed, followed by cyan dots, then magenta dots, and finally yellow dots. With reference to FIG. 4, after the trailing edge of the paper P has cleared the gripping point of the first sub-scanning drive mechanism 25 (the point of contact between the rollers 25a and 25b), the paper is transported only by the second sub-scanning drive mechanism 27, which has a relatively low feed precision in the sub-scanning direction. As a result, when yellow dots are being formed in the low-precision area, which has the same width as the width WLP of the group of yellow nozzles 40Y, the paper is being fed in the sub-scanning direction with a relatively low precision.

Figure 13:
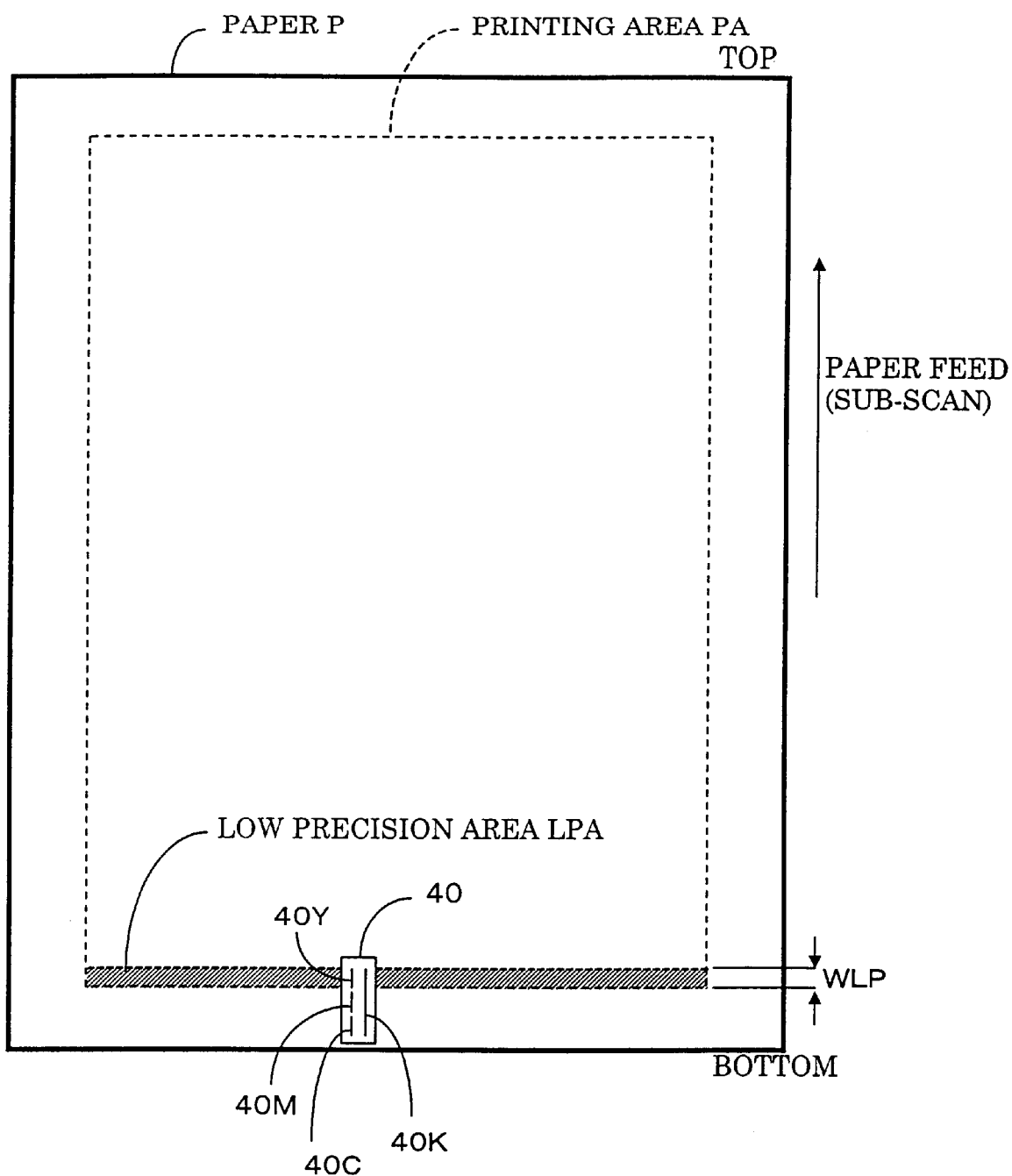
FIG. 13 shows the relationship between the actuator 40 and the low-precision area LPA at the trailing edge of the printing area PA of the paper P.

FIG. 13 shows the relationship between the actuator 40 and the low-precision area LPA at the trailing edge of the printing area PA of the paper P. While yellow dots are being formed within this low-precision area, the paper is being moved in the sub-scanning direction by the second sub-scanning drive mechanism 27 at a relatively low precision. Here, low-precision area LPA refers to an area in which the sub-scanning feed has a low precision. The width of the low-precision area LPA is the same as the width of the group of yellow nozzles 40Y as measured in the sub-scanning direction.

At the point in time shown by FIG. 13, the formation of black, magenta and cyan dots in the low-precision area LPA has been completed. From this point, therefore, only yellow dots will be formed in the area LPA. However, since yellow dots do not stand out as much as dots of the other three colors, even if there is some deviation in the location of the yellow dots caused by the low precision of the sub-scanning feed, it will not have much of an adverse effect on the image quality. Thus, there is the advantage that when the paper is being fed in the sub-scanning direction by just the second sub-scanning drive mechanism 27, the only dots being formed in the low-precision area LPA are yellow dots, so there is little degradation in image quality.

However, the printing process used to in the vicinity of the leading or trailing edges of the paper is usually a different one to that used in the intermediate portion of the printing area. Herein, the printing process used in the vicinity of the trailing edge of the printing area is referred to as trailing edge or lower edge processing, and the printing process used in the intermediate part of the printing area is referred to as intermediate processing. In lower edge processing, to prevent any excessive decrease in sub-scanning feed precision, the feed amounts used are smaller than those used when printing in the mid-part of the printing area. An example of lower edge processing technology is disclosed by the present applicant in JPA Hei 7-242025. FIG. 9 of the disclosure shows the intermediate part of the printing area printed using an interlaced printing scheme, and lower edge processing using fine feeding in which the feed is in single dot increments.

In the present invention lower edge processing is not used when printing yellow dots in the low-precision area LPA. Instead, the sub-scanning feed amounts used are the same as that used for the intermediate processing. Specifically, the feed amounts shown in FIG. 7 are used when printing yellow dots in the low-precision area LPA. In other words, the feed amounts used when the paper is being fed by just the second sub-scanning drive mechanism 27 are the same as those effected using the first sub-scanning drive mechanism 25. This has the advantage of simplifying the control of the sub-scanning feed. Yellow dots are not so noticeable as dots of the other colors, so non-use of lower edge processing does not result in much of a deterioration in the image quality.

F. Second Embodiment of the Printing Scheme:

FIG. 14 shows the scanning parameters used in a second embodiment of the printing scheme of the invention. In this second embodiment, the nozzle pitch k is six dots, the number of scan repeats is one, the number of working nozzles N is 15 and the number of effective nozzles Neff is 15.

The table in FIG. 14 shows the parameters for each of the first through seventh passes. Three sub-scan feed amounts L are used, which are 14, 15 and 16 dots. This printing scheme (scanning scheme) in which a plurality of L values is used is referred to as a variable feed scheme. The scanning parameters of the second embodiment satisfy the aforementioned conditions c1' to c3'.

Figure 15:
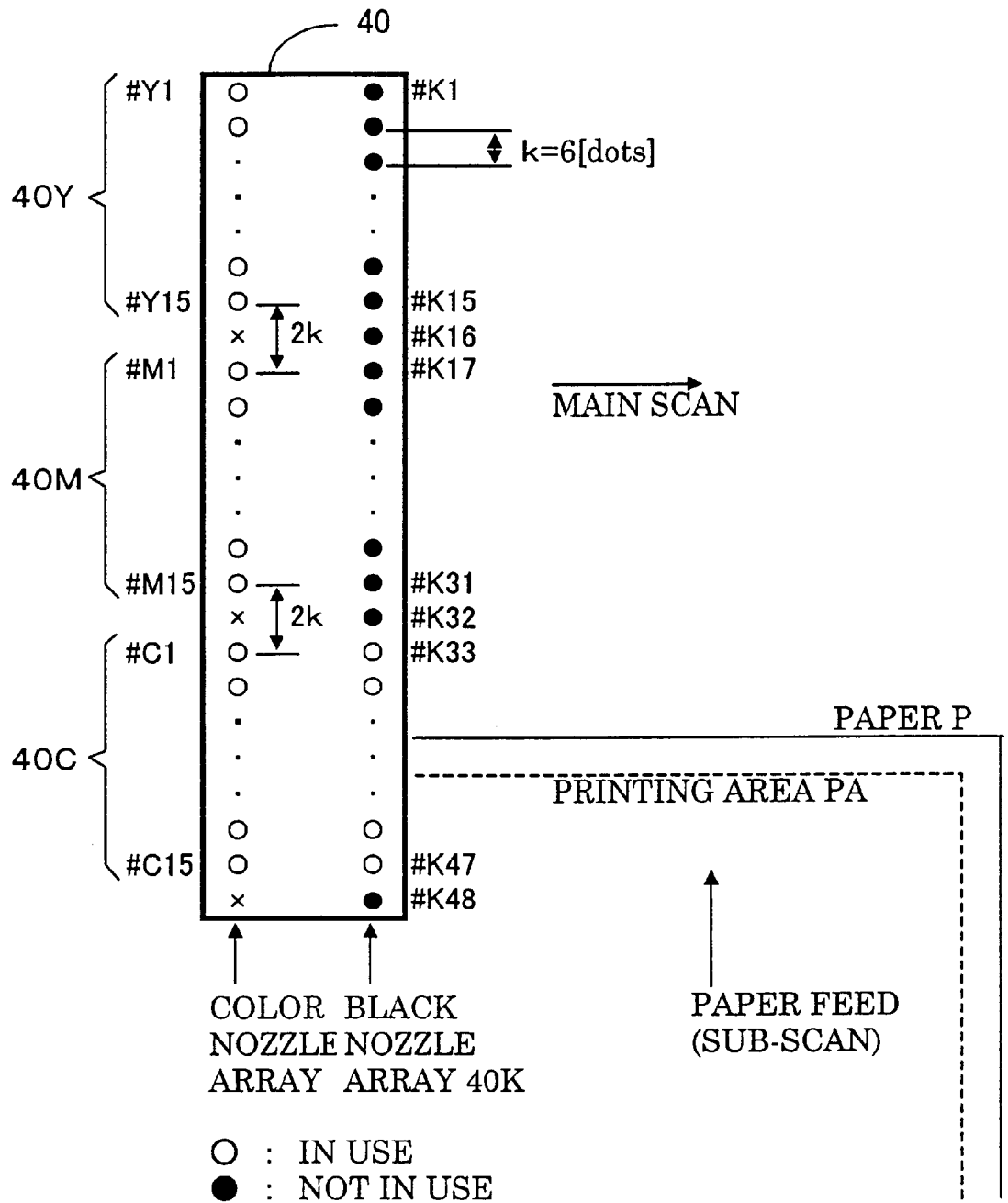
FIG. 15 shows the nozzles used in the second embodiment.

FIG. 15 illustrates the nozzles used in the second embodiment. The actuator 40 shown in FIG. 15 is the same as the one shown in FIG. 3. All of the 15 nozzles of each chromatic ink color are used. With respect to black ink, just the 15 nozzles in the sub-scanning locations corresponding to the cyan nozzles #C1 to #C15 are used. The nozzle #Y15 at the lower end of the group of yellow nozzles and the nozzle #M1 at the upper end of the group of magenta nozzles are separated by an amount that is two times the nozzle pitch k (2k). Similarly, the separation between the nozzle #M15 at the lower end of the group of magenta nozzles and the nozzle #C1 at the upper end of the group of cyan nozzles is also 2k.

In color printing, the second embodiment provides the following advantages. First, the black dots are formed before the dots of the other colors, making it possible to print color images with a high chroma. The second advantage is that in the low-precision area LPA (FIG. 13) only yellow dots are printed, so a lower sub-scanning feed precision does not have much of an adverse effect on image quality. In this embodiment, too, when the paper is being fed in the sub-scanning direction by just the second sub-scanning drive mechanism 27, it can be fed by the same amounts (the feed amounts shown in FIG. 14) used as when the paper is being fed by the first sub-scanning drive mechanism 25.

With respect to the second embodiment, FIG. 16 is an explanatory diagram of the nozzles used to form the raster lines during each pass, within the effective printing area. Because the second embodiment uses a variable feed scheme, the positioning of the nozzle groups on each pass is not as regular as the first embodiment, the advantage of which is that the cumulative sub-scanning feed error is smaller than that of the first embodiment.

Another advantage of the second embodiment is that the accumulated error positions of adjacent nozzle groups are not always the same. In the case of cyan, the biggest difference in the sub-scanning feed passes is 4, between raster lines 2 and 3. That is, there is a accumulated feed error Cmis between raster lines 2 and 3. With respect also to magenta and yellow, accumulated feed errors Mmis, Ymis are located between raster lines 2 and 3. However, the next Cmis and Mmis are between raster lines 8 and 9, while the next Ymis is between raster lines 7 and 8.

Thus, in the case of the second embodiment the accumulated error positions of the three working nozzle groups Cmis, Mmis, Ymis do not always coincide, so there is less banding compared to when the positions of Cmis, Mmis and Ymis always coincide.

Figure 17:
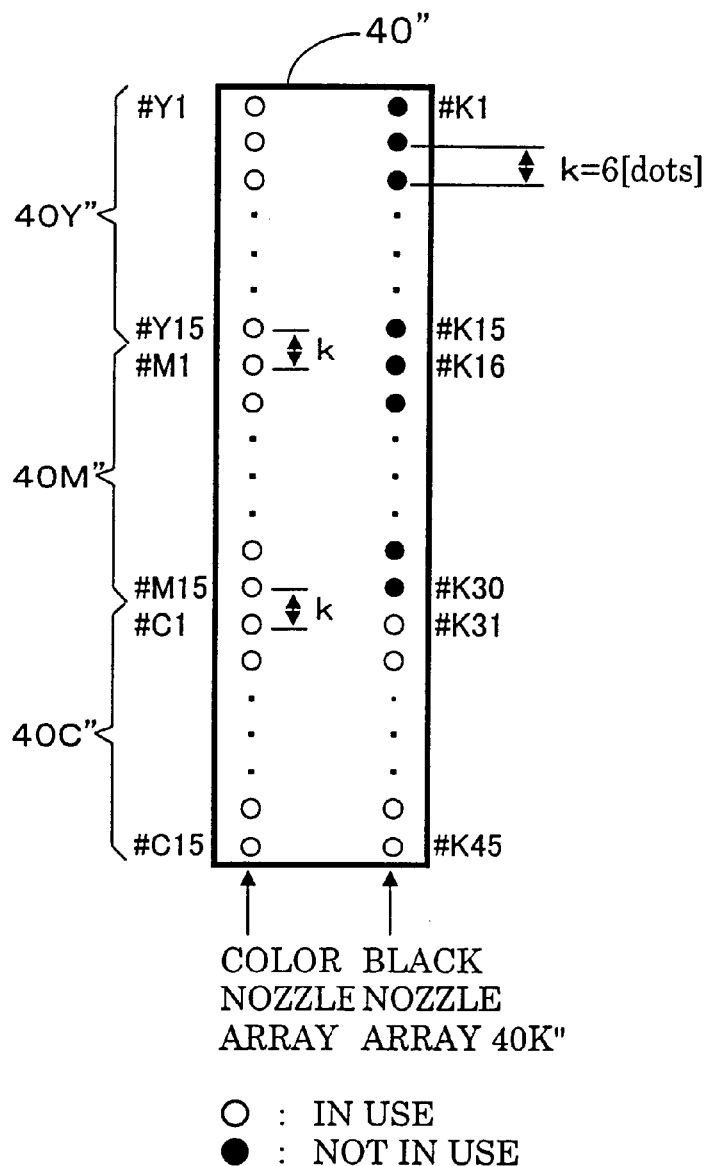
FIG. 17 shows the nozzles used in a second comparative example.

FIG. 17 shows the actuator used in a second comparative example. The actuator 40" is comprised of a group of 15 yellow nozzles 40Y", a group of 15 magenta nozzles 40M" and a group of 15 cyan nozzles 40C". The spacing between the adjacent end nozzles of the groups is the same as the nozzle pitch k. The group of black ink nozzles 40K" comprises 45 nozzles. The arrangement of the second comparative example uses this actuator 40" to effect printing in accordance with the same scanning parameters as those of the second embodiment shown in FIG. 14.

FIG. 18 is an explanatory diagram showing the nozzles used to form the raster lines during each pass, within the effective printing area, in the case of the second comparative example. The accumulated error positions Cmis, Mmis, Ymis of the three chromatic color inks fall between raster lines 2 and 3, 8 and 9 and 14 and 15. That is, in the second comparative example the accumulated error positions Cmis, Mmis, Ymis of the three colored inks always coincide and are repeated at six-dot intervals (that is, at the same pitch as the nozzle pitch k), making banding more noticeable.

As can be seen from a comparison between the working nozzles of FIG. 15 and 17, the only difference between the second embodiment and the second comparative example is the spacing between the groups of working nozzles. Specifically, in the case of the second embodiment the spacing between the groups is set at 2k (two times the nozzle pitch k) while in the case of the second comparative example the spacing is the same as the nozzle pitch k. This difference in the spacing between the groups of working nozzles is manifested in the differences in accumulated error positions Cmis, Mmis and Ymis seen in FIG. 16 and 18.

As in the first embodiment, the second embodiment uses a selection of working nozzles that results in the spacing between groups of working nozzles being M times the nozzle pitch k, where M is an integer of 2 or more. Also, the spacing between adjacent groups of working nozzles is set at a value other than (N×n+1) k dots where N is the number of working nozzles and n is an arbitrary integer of one or more.

As can be seen in FIG. 15, the second embodiment uses all of the chromatic color ink nozzles of the actuator 40. Since the spacing between implemented nozzle groups is set to twice the nozzle pitch k, even though all of the chromatic color ink nozzles are used, this does not result in the accumulated secondary feed error positions in respect of those inks constantly coinciding. The advantage of this is that using as many of the actuator 40's nozzles as possible makes it possible to print high-quality images.

It is desirable that the spacing between groups of implemented nozzles arrayed in the sub-scanning direction (that is, the spacing between the end nozzles of the adjacent groups of implemented nozzles used for each ink) be m times the nozzle pitch k (where m is an integer of two or more), since this enables the use of the most nozzles and thereby results in high print quality.

The spacing between the groups of implemented nozzles arrayed in the sub-scanning direction can also be set to be equal to the nozzle pitch k. In such a case, the working nozzle group configurations of the first and second embodiments can be implemented by not using some of the nozzles as working nozzles.

Figure 19:
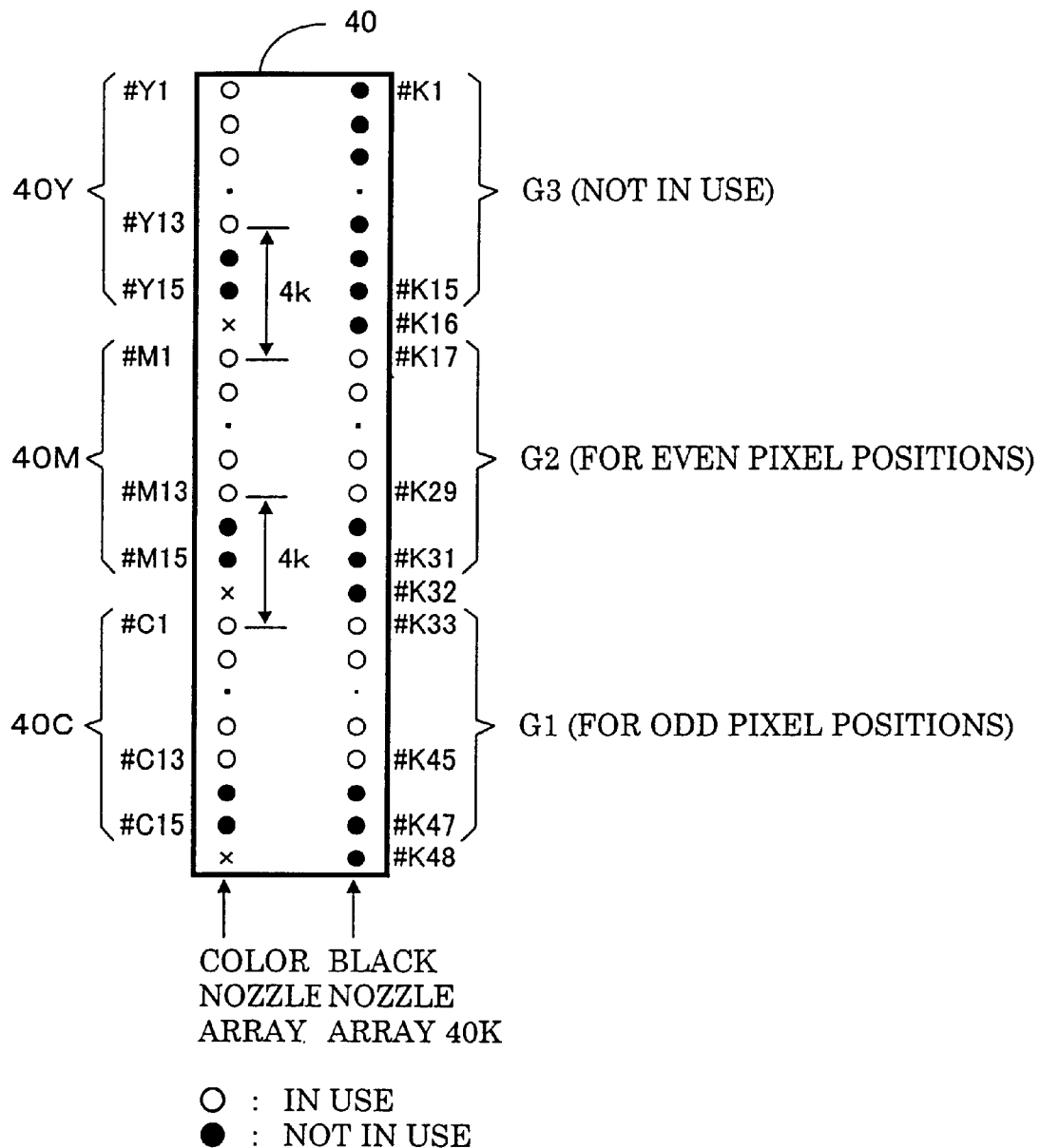
FIG. 19 shows the nozzles used in a third embodiment.

G. Other Embodiments:

FIG. 19 shows the working nozzles of a third embodiment. The only difference from the first embodiment is the group of black working nozzles. The hardware configuration is the same as that of the first embodiment. With respect to the chromatic color nozzles, the scanning parameters used are the same as those of the first embodiment, shown in FIG. 7. Concerning the black ink nozzles, the nozzle pitch k and feed amounts L are the same as the first embodiment, but the number of scan repeats, working nozzles N and effective nozzles Neff are different.

In FIG. 19, the array of black nozzles 40K are divided into three groups, G1, G2 and G3, corresponding to the three groups of chromatic color nozzles 40C, 40M and 40Y. Nozzle group G1 comprises the 15 nozzles #K33 to #47, corresponding in position to the group of cyan nozzles 40C; nozzle group G2 comprises the 15 nozzles #K17 to #31, corresponding in position to the group of magenta nozzles 40M; and nozzle group G3 comprises the 15 nozzles #K1 to #15, corresponding in position to the group of yellow nozzles 40Y. Black nozzles #K16, #K32 and #K48 located at non-working positions do not belong to any of the groups G1 to G3.

The third embodiment uses a total of 26 nozzles selected from groups G1 and G2. That is, of the nozzles of G1, the nozzles #K33 to #K45, corresponding in position to cyan nozzles #C1 to #C13, are used; and of the nozzles of G2, the nozzles #K17 to #K29, corresponding to magenta nozzles #M1 to #M13, are used.

The nozzles #K33 to #K45 are used to form black dots at the odd-numbered pixel positions on each raster line, while the nozzles #K17 to #K29 are used to form black dots at the even-numbered pixel positions. With respect to black dots, the number of scan repeats is two, the number of working nozzles N is 26 and the number of effective nozzles Neff is 13. To put it another way, the nozzles of the two groups G1 and G2 are used to print by the overlap scheme.

Thus using overlapping to print the black dots means that even when there are variations in the characteristics of the black ink nozzles (pitch, inkjet properties, etc.), it is possible to prevent an entire raster line being affected by the characteristics of a particular nozzle. As a result, banding is alleviated, thereby improving the image quality.

Figure 20:
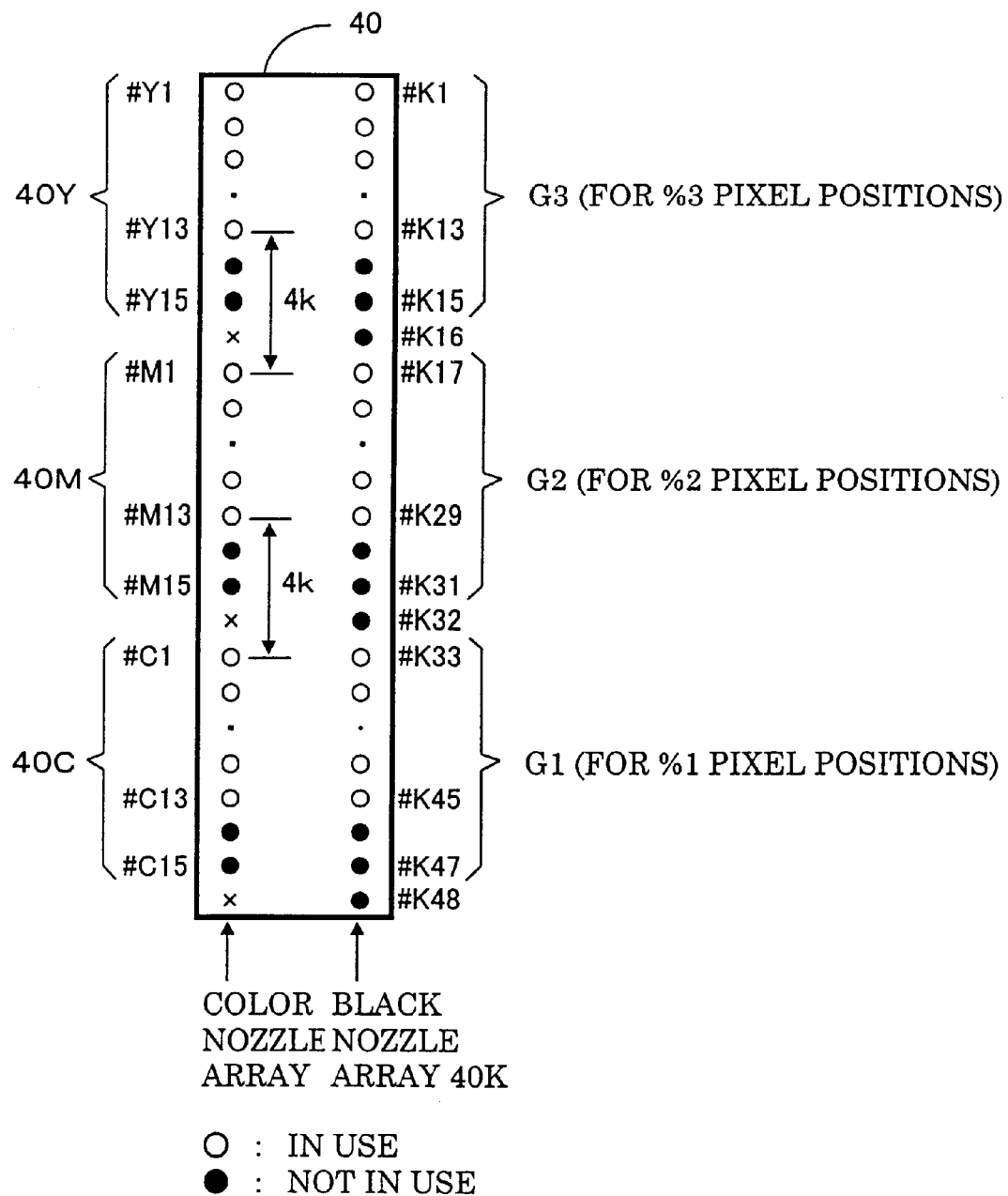
FIG. 20 shows the nozzles used in a fourth embodiment.

FIG. 20 shows the working nozzles according to a fourth embodiment, which adds the black working nozzles of the third embodiment. Specifically, the same working nozzles of nozzle groups G1 and G2 shown in FIG. 19 are used in the fourth embodiment, which also, in group G3, uses nozzles #K1 to #K13 corresponding in position to the yellow working nozzles #Y1 to #Y13.

In the fourth embodiment the working nozzles of G1 to G3 are used to print black dots at mutually different pixel positions %1, %2, %3 along the raster lines. Here, pixel position %i (where i is an integer from 1 to 3) means the pixel position (also referred to as dot position) i that is the residual of the division of the pixel coordinates by 3. Therefore, with respect to the black dots, the number of scan repeats is 3, the number of working nozzles N is 39 and the number of effective nozzles Neff is 13. In other words, the three nozzle groups G1, G2 and G3 are used to form black dots by the overlap scheme.

The fourth embodiment uses a larger number of scan repeats than the third embodiment, reducing banding and thereby providing a more pronounced image quality improvement effect than the third embodiment.

The second embodiment can also be used to form black dots by the same overlap scheme illustrated by FIG. 19 and 20.

As can be understood from the embodiments described in the foregoing, when using groups of N chromatic color nozzles, color printing can be effected using groups of black nozzles in which the N nozzles are comprised of j sets (where j is an integer of 1 or more). For this, the pixel positions on each raster line are classified into j mutually-differing pixel groups and each group of black nozzles is used to form dots at the pixel positions of one of these pixel groups.

When the actuator 40 of the above embodiments is used, the integer j will be a value that is not more than three, the number of chromatic color nozzle groups. When the black nozzle array contains more nozzles, j may be set at a value that is larger than the number of chromatic color nozzle groups.

The pixel position groups of each raster may be classified by a different method than the one shown in FIG. 19 and 20. For example, pairs of adjacent pixels may be used as the unit for the classification. The pixel positions along a raster line should be systematically classified into a plurality of groups.

Figure 21:
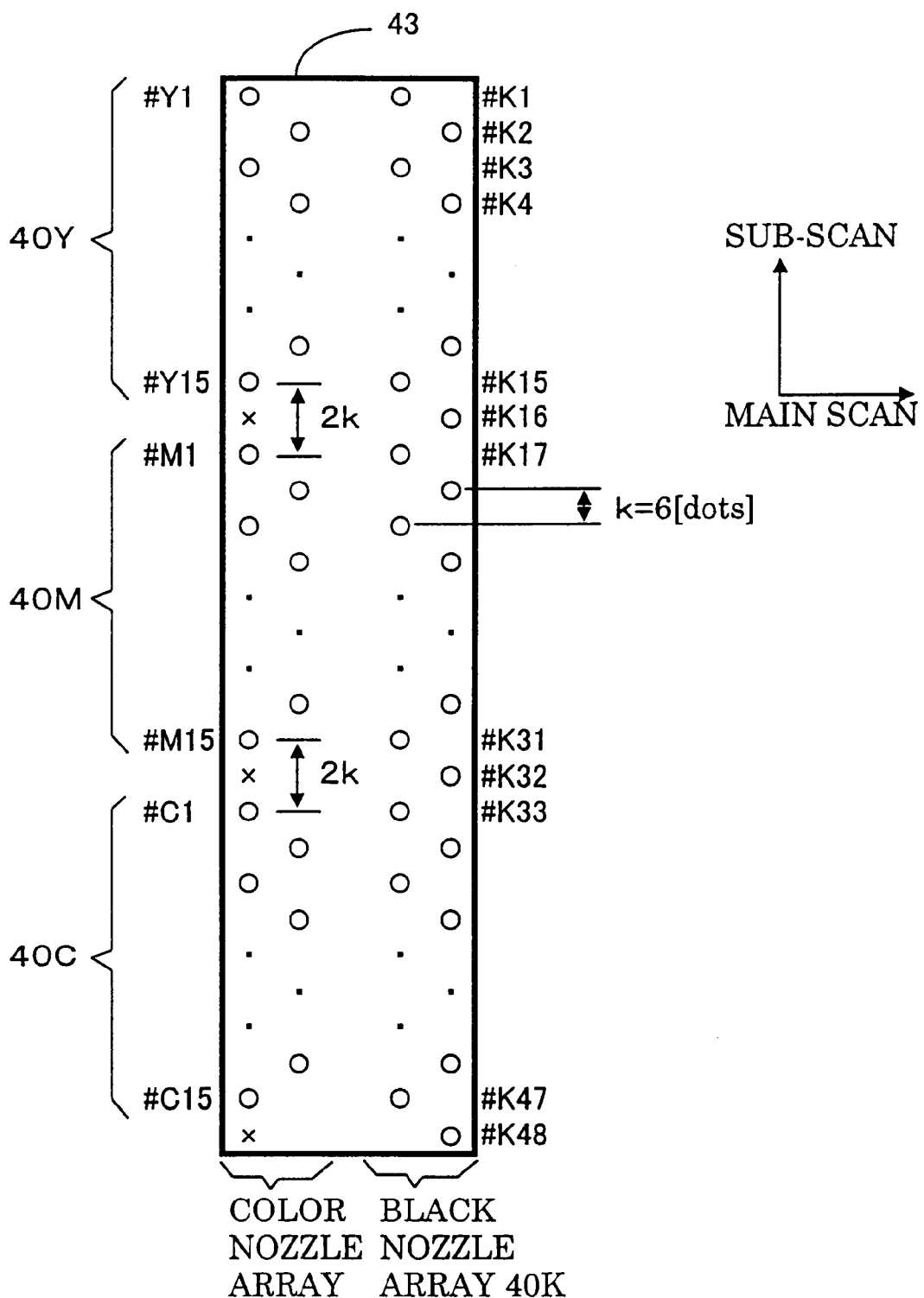
FIG. 21 shows a first actuator variation.

H. Actuator Variations:

FIG. 21 shows an actuator according to a first variation. In this actuator 43, the color nozzle array and black nozzle array 40K of the actuator 40 of the embodiment shown in FIG. 3 are each disposed in a zigzag arrangement, with the odd-numbered black nozzles, as one example, on the left and the even-numbered nozzles on the right. The same type of zigzag arrangement is also used for the groups of chromatic color nozzles 40Y, 40M and 40C. Even with this zigzag arrangement, the nozzles of the groups 40Y, 40M and 40C are still arrayed along a straight line in the sub-scanning direction. Thus, the description "a plurality of nozzle groups are arrayed along a straight line in the sub-scanning direction" refers to the groups of nozzles being arrayed along what is a straight line in overall terms, not that the nozzles that comprise each group have to be in a straight line.

Figure 22:
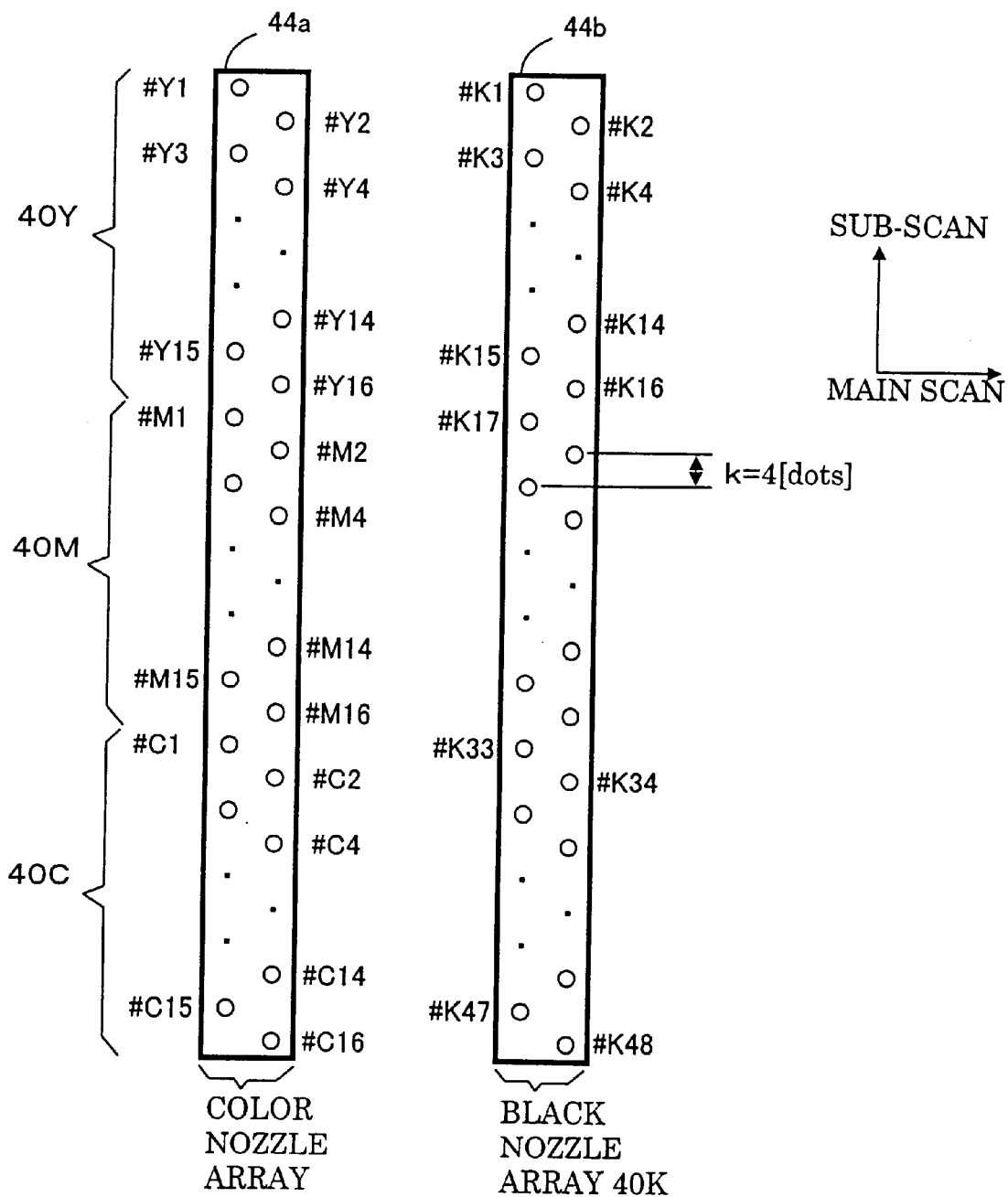
FIG. 22 shows a second actuator variation.

FIG. 22 shows an actuator according to a second variation, comprising a first actuator 44a having just the color nozzle arrays, and a second actuator 44b having just the black nozzle array 40K. Here too, the color nozzles are arranged in a zigzag configuration. The substantive difference from the actuator of FIG. 21 is that each color nozzle group has 16 nozzles and the spacing between the groups of color nozzles is equal to the nozzle pitch k. In the case of FIG. 22 the nozzle pitch k is set at four dots. When all 16 of the nozzles of each color group are used during color printing, black nozzles #K33 to #K48 are used.

Figure 23:
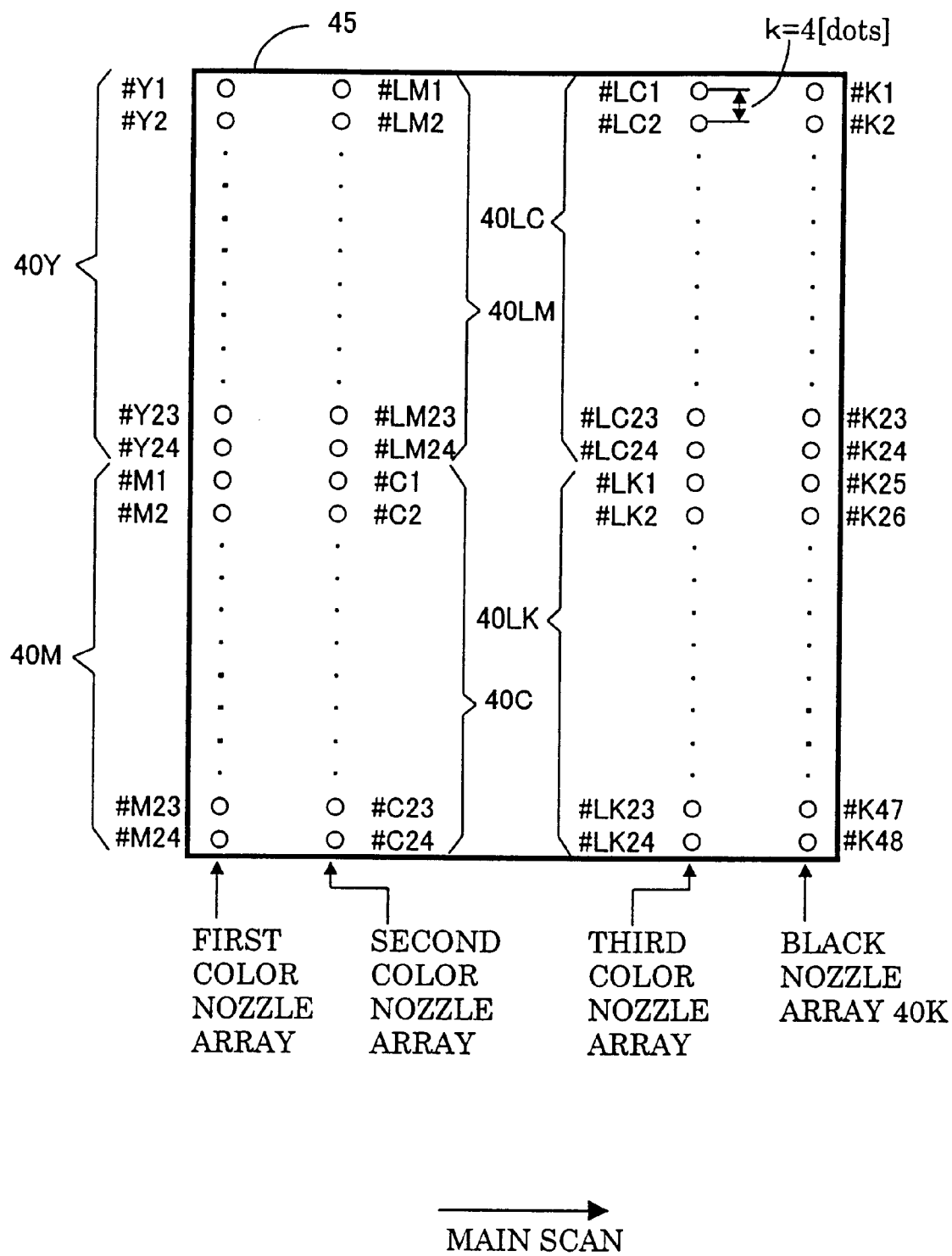
FIG. 23 shows a third actuator variation.

FIG. 23 shows an actuator according to a third variation. The actuator 45 includes three arrays of color nozzles and one array of black nozzles. A first array of color nozzles is comprised of a group of yellow nozzles 40Y and a group of magenta nozzles 40M. A second array of color nozzles is comprised of a group of light magenta nozzles 40LM and a group of cyan nozzles 40C. A third array of color nozzles is comprised of a group of light cyan nozzles 40LC and a group of light black nozzles 4OLK. The term "light black" means gray, not solid black. Light magenta has more or less the same hue as magenta, and means a low ink concentration. This is also the case with respect to light cyan.

The groups of nozzles are each arrayed in a straight line in the sub-scanning direction, but may be arrayed in a zigzag arrangement as in FIG. 21 or FIG. 22. The black nozzle array 40K has 48 nozzles. Each of the other nozzle groups has 24 nozzles. When all 24 of the nozzles of each color group are used during color printing, the 24 black nozzles #K25 to #K48 are used.

In color printing with the actuator 45, dots are formed on the printing paper in order of black, light black, cyan, magenta, light cyan, light magenta, and yellow. This means that black dots can be printed before dots of other colors during color printing, and that yellow dots are formed after the dots of other colors.

Figure 24:
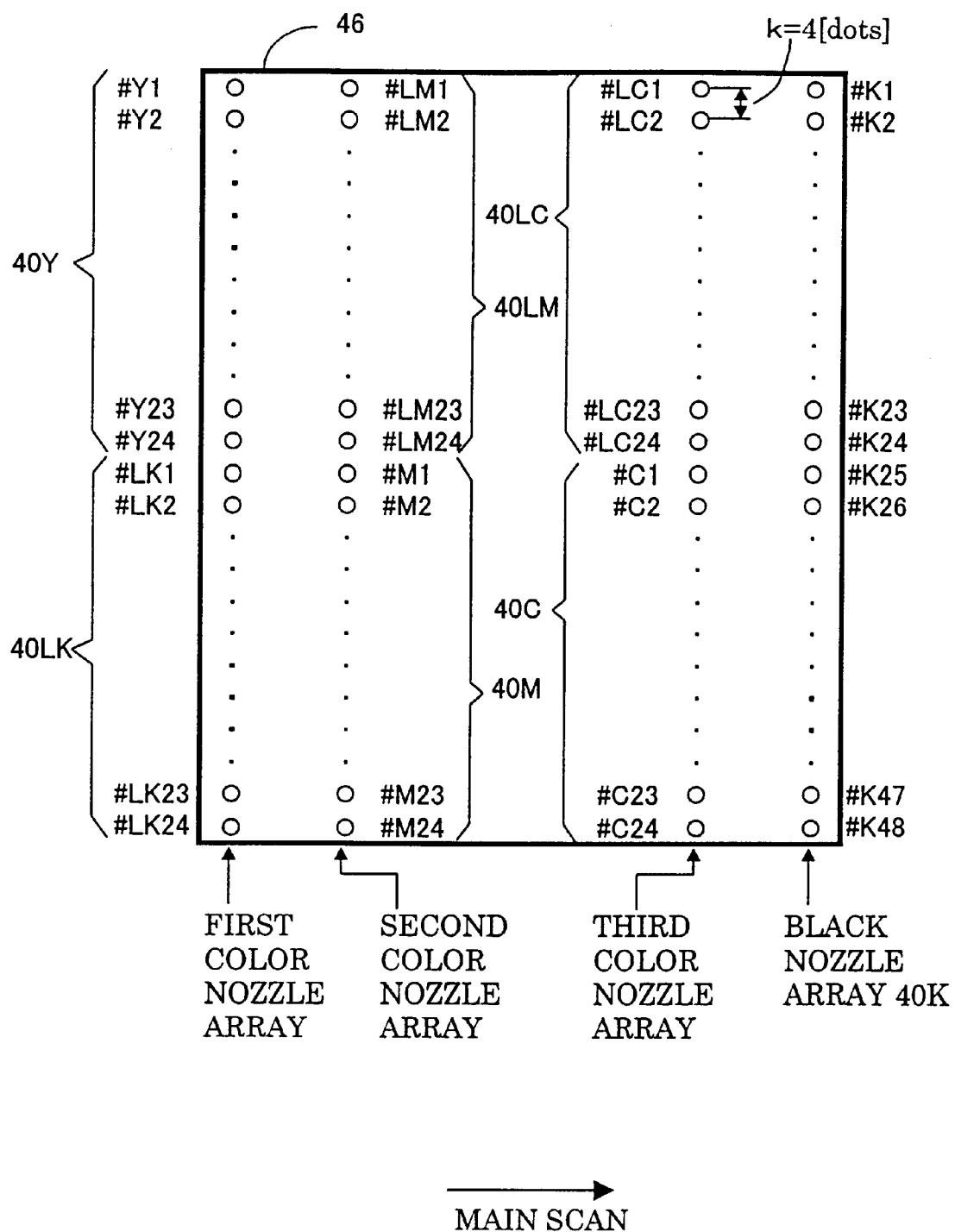
FIG. 24 shows a fourth actuator variation.
Figure 25:
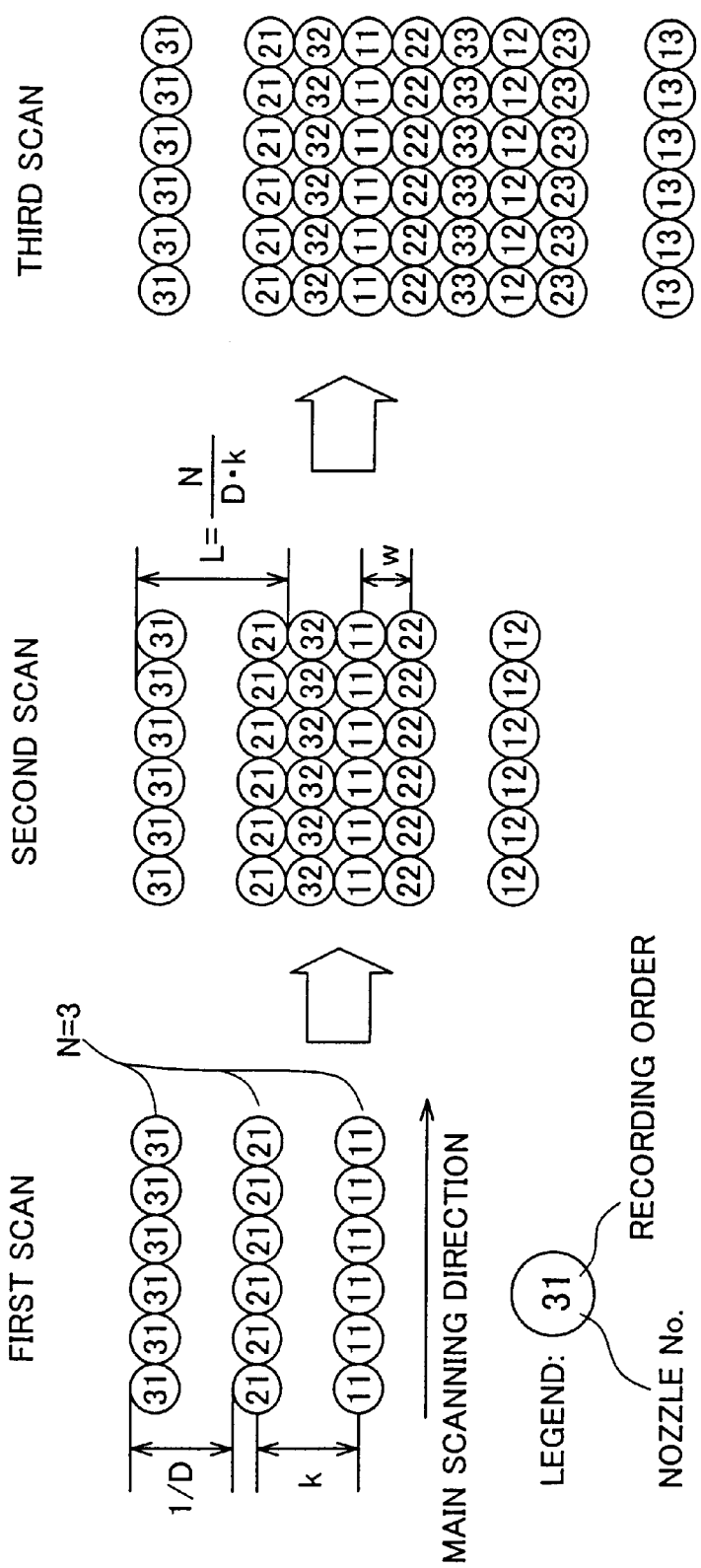
FIG. 25 shows an example of an interlaced printing scheme.
Figure 26:
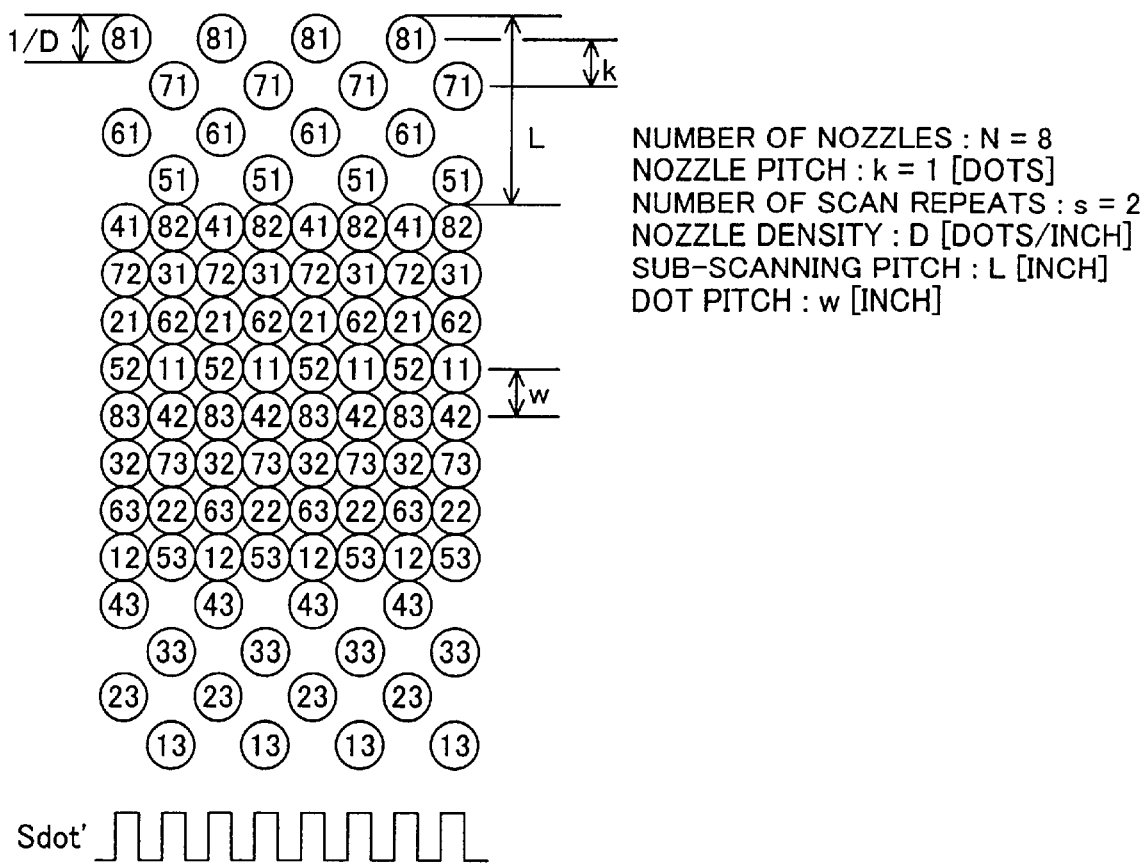
FIG. 26 shows an example of an overlapping printing scheme.

FIG. 24 shows an actuator according to a fourth variation. The actuator 46 also includes three arrays of color nozzles and one array of black nozzles. The difference between the actuator 46 and that of FIG. 23 is the positions of the nozzle groups other than the black nozzle group 40K and the yellow nozzle group 40Y. In color printing with this actuator 46, black dots can be printed before dots of other colors during color printing, and yellow dots are formed after the dots of other colors.

As shown by FIGS. 23 and 24, an actuator may be provided with two or more color nozzle arrays, and two or more arrays of black nozzles. Thus, the invention can be applied to cases in which the print head has at least one array of color nozzles and at least one array of black nozzles.

I. Modifications (1) The above embodiments have been described with reference only to unidirectional printing in which dots are printed only during a forward pass in the main scanning direction. However, the invention can also be applied to bi-directional printing in which dots are printed during both forward and reverse passes.

(2) Depending on the printer, the dot pitch (printing resolution) in the main scanning direction and the dot pitch in the sub-scanning direction can be set at different values. In such a case, parameters relating to the main scanning direction (such as the pitch of pixels on the raster lines, for example) are defined by the dot pitch in the main scanning direction, while parameters relating to the sub-scanning direction (such as nozzle pitch k and feed amount L, for example) are defined by the dot pitch in the sub-scanning direction.

(3) The invention can also be applied to drum scanning printers, in which case the direction of drum rotation becomes the main scanning direction and the direction of carriage travel the sub-scanning direction. In addition to inkjet printers, the invention can also be applied to any printing apparatus that prints on media using a print head having an array of multiple dot formation elements. By dot formation element is meant a constituent element for forming dots, such as an ink nozzle in the case of an inkjet printer. A facsimile machine and copiers are examples of such printing apparatuses.

(4) While the structures of the above embodiments have been described in terms of hardware implementations thereof, the hardware may be partially replaced by software implementations. Conversely, software-based configurations may be partially replaced by hardware. For example, some of the functions of the system controller 54 (FIG. 2) may be implemented by the host computer 100.

Computer programs for realizing such functions may be provided stored on a storage medium that can be read by computer such as floppy disks and CD-ROM disks. The host computer 100 can transfer the program from the storage medium to an internal or external storage device. Alternatively, communication means may be used to send the programs to the host computer 100. To effect program functions, the stored program can be executed directly or indirectly by the host computer 100.

The host computer 100 as referred to herein is taken to include hardware and operating system, with the hardware functioning under the control of the operating system. Some of the above functions may be implemented by the operating system instead of an application program.

The storage media that can be read by computer referred to herein are not limited to portable storage media such as floppy disks and CD-ROM disks, but also includes internal storage and memory devices such as various types of RAM and ROM as well as external fixed storage such as hard disks.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A printing apparatus that prints images by forming dots on a print medium, comprising:
    a print head that includes a plurality of dot formation elements configured to form dots on the print medium;
    a main scanning drive section that drives at least one of the print head and the print medium for a main scan;
    a head drive section that, during the main scan, causes at least a portion of the plurality of dot formation elements to form dots;

a sub-scanning drive section that, upon a completion of each main scan, drives at least one of the print head and the print medium for a sub-scan; and a controller configured to control the main scanning drive section, the head drive section, and the sub-scanning drive section;

wherein:

the print head including a first dot formation element array and a second dot formation element array;

the first dot formation element array including a plurality of color dot formation element groups arranged in the sub-scanning direction and configured to form dots with color inks, each of the plurality of color dot formation element groups including an equal number of first dot formation elements;

the second dot formation element array including a plurality of second dot formation elements arranged parallel to the first dot formation element array and configured to form black dots;

the plurality of second dot formation elements disposed at same sub-scanning positions as the first dot formation elements included in the plurality of color dot formation element groups;

the controller being configured to use, during a color printing, a number N of the first dot formation elements of each color dot formation element group, N being an integer greater than 1, to form dots on the print medium, and to use j sets of the second dot formation elements included in the second dot formation element array, j being a second integer greater than 0, each set of second dot formation elements comprised of N dot formation elements, to form black dots;

one set of the N second dot formation elements being disposed at same sub-scanning positions as the N first dot formation elements for a specific color ink, the one set of the N second dot formation elements and the N first dot formation elements for a specific color ink being used in a same main scanning pass to form black dots and color ink dots of the specific color ink on the same scanning lines;

the controller being programmed to control the main scanning drive section and the sub-scanning drive section such that, with respect to each ink, (i) one cycle of sub-scans, which is repeated during printing, includes k×s sub-scans, k being an integer greater than 1 and representing a pitch of the dot formation elements expressed as a number of dots in the sub-scanning direction, s being an integer greater than zero and representing a number of main scans performed to form dots on each raster line, (ii) an offset F after each said k×s sub-scans assumes every value from 0 to k−1 each s times with a sub-scan feed amount L in the one cycle, the offset F being a remainder of a division of $\Sigma L$ by k, $\Sigma L$ being a sum of each said sub-scan feed amount L, each said sub-scan feed amount L being an integer expressed as a number of dots, and (iii) an average sub-scan feed amount L for the k×s sub-scans in the one cycle is equal to $\Sigma L/(k\times s)$.

2. A printing apparatus according to claim 1, wherein:

the first dot formation elements and the plurality of second dot formation elements arranged along the sub-scanning direction with an identical constant pitch k; and when j being 1, the controller implementing formation of black dots using only second dot formation elements located at the same sub-scanning positions as first dot formation elements in a specific color dot formation element group within the first dot formation element array, the specific color dot formation element group being a group that can print dots before other color dot formation element groups.

3. A printing apparatus according to claim 2, wherein the first and the second dot formation element arrays are formed within identical actuators.

4. A printing apparatus according to claim 1, wherein:

the first and second dot formation elements arranged along the sub-scanning direction with an identical constant pitch k; and when j being at least 2, j sets of second formation elements are used to print black dots at j different groups of dot positions along main scanning lines, respectively.

5. A printing apparatus according to claim 4, wherein the first and second dot formation arrays are formed within identical actuators.

6. A method of printing images by forming dots on a print medium using a print head including a first array including a plurality of dot formation element groups, each group comprising first dot formation elements configured to form color dots, and a second array including a plurality of second dot formation elements configured to form black dots, the first and second arrays arranged parallel along the sub-scanning direction, the first and second dot formation elements arranged at same sub-scanning positions in the sub-scanning direction, comprising steps of:

sub-scanning said print medium, comprising repeating a sub-scan cycle including scanning k×s sub-scans and offsetting F after each said k×s sub-scans with a sub-scan feed amount L, wherein:

k is an integer greater than 1 and representing a pitch of the dot formation elements expressed as a number of dots in the sub-scanning direction, s is an integer greater than zero and representing a number of main scans performed to form dots on each raster line, F assumes every value from 0 to k−1 s times and is a remainder of a division of $\Sigma L$ by k, $\Sigma L$ is a sum of each said sub-scan feed amount L, each said sub-scan feed amount L is an integer expressed as a number of dots, and an average sub-scan feed amount L for the k×s sub-scans in the one cycle is equal to $\Sigma L/(k\times s)$;

each of said scanning k×s sub-scans step comprising main scanning said print medium including selecting a number N of first dot formation elements from each dot formation element group, N being an integer greater than 1, selecting j sets of the second dot formation elements, j being an integer greater than zero and each of j sets including N second dot formation elements, and printing using one set of the j sets and the number N of first dot formation elements of a specific color in said main scanning step.

7. The method according to claim 6, wherein said main scanning said print medium step further comprises a step of:

printing black dots using only second dot formation elements located at the same sub-scanning positions as first dot formation elements in a specific color dot formation element group within the first array, the specific color dot formation element group being a group that can print dots before the other color dot formation element groups;

wherein the first and second dot formation elements arranged along the sub-scanning direction with an identical constant pitch k.

8. A computer readable medium containing program instructions for execution on a computer system, which when executed by a computer, cause the computer system to perform the method recited in claim 7.

9. The method according to claim 6, wherein said main scanning said print medium step further comprises a step of:

printing, when j being at least 2, black dots at j different groups of dot positions along main scanning lines using j sets of second formation elements, respectively;

wherein the first and second dot formation elements arranged along the sub-scanning direction with an identical constant pitch k.

10. A computer readable medium containing program instructions for execution on a computer system, which when executed by a computer, cause the computer system to perform the method recited in claim 9.

11. A computer readable medium containing program instructions for execution on a computer system, which when executed by a computer, cause the computer system to perform the method recited in claim 6.

12. A printing apparatus that prints images by forming dots on a print medium, comprising:

a print head that includes a plurality of dot formation elements configured to form dots on the print medium;

a main scanning drive section that drives at least one of the print head and the print medium for a main scanning;

a head drive section that, during the main scan, causes at least a portion of the plurality of dot formation elements to form dots;

a sub-scanning drive section that, upon a completion of each main scan, drives at least one of the print head and the print medium for a sub-scan; and a controller configured to control the main scanning drive section, the head drive section, and the sub-scanning drive section;

wherein;

the print head including a first dot formation element array and a second dot formation element array;

the first dot formation element array including a plurality of color dot formation element groups arranged in the sub-scanning direction and configured to form dots with color inks, each of the plurality of color dot formation element groups including an equal number of first dot formation elements;

the second dot formation element array including a plurality of second dot formation elements arranged parallel to the first dot formation element array and configured to form black dots;

the plurality of second dot formation elements disposed at same sub-scanning positions as the first dot formation elements included in the plurality of color dot formation element groups;

the controller being configured to use, during color printing, a number N of the first dot formation elements of each color dot formation element groups, N being an integer greater than 1, to form dots on the print medium, and to use a number M of the second dot formation elements included in the second dot formation element array to form black dots, M being a second integer greater than N and equal to an integral multiple of N;

the controller further being configured to execute overlap printing during color printing, said controller configured to form intermittent dots using a number (M-N) of the second dot formation elements at pixels on a same scanning line during a main scan pass and to form all dots on the same scanning line during plural said main scan passes.

13. A printing apparatus according to claim 12, wherein the first and second dot formation element arrays are formed within identical actuators.

14. A method of printing images by forming dots on a print medium using a print head including a first array including a plurality of dot formation element groups, each group comprising first dot formation elements configured to form color dots, and a second array including a plurality of second dot formation elements configured to form black dots, the first and second arrays arranged parallel along the sub-scanning direction, the first and second dot formation elements arranged at same sub-scanning positions in the sub-scanning direction, comprising steps of:

selecting a number N of first dot formation elements from each dot formation element group, N being an integer greater than 1;

selecting a number M of the second dot formation elements, M being a second integer greater than N and equal to an integral multiple of N; and overlap printing including forming intermittent pixels using a number (M−N) second dot formation elements in said same main scanning pass while forming all pixels on the same scanning line using plural said main scanning passes.

15. A computer readable medium containing program instructions for execution on a computer system, which when executed by a computer, cause the computer system to perform the method recited in claim 14.

* * * * *